(12) United States Patent
Khakpour et al.

(10) Patent No.: US 9,519,614 B2
(45) Date of Patent: *Dec. 13, 2016

(54) MULTI-LAYER MULTI-HIT CACHING FOR LONG TAIL CONTENT

(71) Applicant: Verizon Digital Media Services Inc., Playa Vista, CA (US)

(72) Inventors: Amir Khakpour, Los Angeles, CA (US); Robert J. Peters, Santa Monica, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 696 days.

This patent is subject to a terminal disclaimer.

(21) Appl. No.: 13/861,637

(22) Filed: Apr. 12, 2013

(65) Prior Publication Data
US 2013/0227051 A1 Aug. 29, 2013

Related U.S. Application Data

(63) Continuation-in-part of application No. 13/720,859, filed on Dec. 19, 2012, now Pat. No. 8,639,780, which is a continuation of application No. 13/347,615, filed on Jan. 10, 2012, now Pat. No. 8,370,460.

(51) Int. Cl.
| | |
|---|---|
| *G06F 15/16* | (2006.01) |
| *G06F 15/167* | (2006.01) |
| *H04L 29/08* | (2006.01) |
| *H04N 21/231* | (2011.01) |

(52) U.S. Cl.
CPC ....... *G06F 15/167* (2013.01); *H04L 29/08729* (2013.01); *H04L 67/2842* (2013.01); *H04N 21/23106* (2013.01)

(58) Field of Classification Search
CPC .......... H04L 67/2842; H04L 29/08729; H04N 21/23106
USPC ......................................... 709/219
See application file for complete search history.

(56) References Cited

U.S. PATENT DOCUMENTS

| | | | |
|---|---|---|---|
| 6,920,477 B2 * | 7/2005 | Mitzenmacher | .... H04L 67/2852 |
| | | | 707/999.101 |
| 7,019,674 B2 | 3/2006 | Cadambi et al. | |
| 7,548,908 B2 | 6/2009 | Fu et al. | |
| 7,930,547 B2 | 4/2011 | Hao et al. | |
| (Continued) | | | |

*Primary Examiner* — James Conaway
(74) *Attorney, Agent, or Firm* — Los Angeles Patent Group; Arman Katiraei

(57) ABSTRACT

Some embodiments provide an optimized multi-hit caching technique that minimizes the performance impact associated with caching of long-tail content while retaining much of the efficiency and minimal overhead associated with first hit caching in determining when to cache content. The optimized multi-hit caching utilizes a modified bloom filter implementation that performs flushing and state rolling to delete indices representing stale content from a bit array used to track hit counts without affecting identification of other content that may be represented with indices overlapping with those representing the stale content. Specifically, a copy of the bit array is stored prior to flushing the bit array so as to avoid losing track of previously requested and cached content when flushing the bit arrays and the flushing is performed to remove the bit indices representing stale content from the bit array and to minimize the possibility of a false positive.

16 Claims, 20 Drawing Sheets

(56) References Cited

U.S. PATENT DOCUMENTS

| | | |
|---|---|---|
| 7,937,428 B2 | 5/2011 | Beyer et al. |
| 7,965,626 B2 | 6/2011 | Tan et al. |
| 8,032,732 B2 | 10/2011 | Beyer et al. |
| 2003/0005036 A1 | 1/2003 | Mitzenmacher |
| 2008/0155229 A1 | 6/2008 | Beyer et al. |
| 2008/0320222 A1* | 12/2008 | Dhodapkar ............ G06F 12/121 711/118 |
| 2009/0119455 A1 | 5/2009 | Kisel et al. |
| 2009/0182726 A1 | 7/2009 | Wang |
| 2010/0332595 A1 | 12/2010 | Fullagar et al. |
| 2011/0320715 A1 | 12/2011 | Ickman et al. |
| 2012/0084459 A1* | 4/2012 | Wu .................... H04L 45/7453 709/238 |
| 2013/0114597 A1* | 5/2013 | Ogisawa ............... H04L 12/185 370/390 |
| 2013/0166625 A1* | 6/2013 | Swaminathan .. H04N 21/64738 709/203 |
| 2014/0164308 A1* | 6/2014 | Verhoeyen ........ H04L 29/08729 706/46 |

* cited by examiner

MULTI-LAYER MULTI-HIT CACHING FOR LONG TAIL CONTENT

CLAIM OF BENEFIT TO RELATED APPLICATIONS

This application is a continuation-in-part of U.S. nonprovisional application Ser. No. 13/720,859, entitled "Optimized Multi-Hit Caching for Long Tail Content", filed Dec. 19, 2012, which is a continuation of United States nonprovisional application Ser. No. 13/347,615, entitled "Optimized Multi-Hit Caching for Long Tail Content", filed Jan. 10, 2012, now issued as U.S. Pat. No. 8,370,460. The contents of application Ser. Nos. 13/720,859 and 13/347,615 are hereby incorporated by reference.

TECHNICAL FIELD

The present invention relates to content caching.

BACKGROUND ART

Content delivery networks (CDNs) have greatly improved the way content is transferred across data networks such as the Internet. One way a CDN accelerates the delivery of content is to reduce the distance that content travels in order to reach a destination. To do so, the CDN strategically locates surrogate origin servers, also referred to as caching servers or edge servers, at various points-of-presence (PoPs) that are geographically proximate to large numbers of end users and the CDN utilizes a traffic management system to route requests for content hosted by the CDN to the caching server that can optimally deliver the requested content to the requesting end user. As used hereafter optimal delivery of content refers to the most efficient available means with which content can be delivered from a server to an end user machine over a data network. Optimal delivery of content can be quantified in terms of latency, jitter, packet loss, distance, and overall end user experience.

Determination of the optimal caching server may be based on geographic proximity to the requesting end user as well as other factors such as load, capacity, and responsiveness of the caching servers. The optimal caching server delivers the requested content to the requesting end user in a manner that is more efficient than when origin servers of the content provider deliver the requested content. For example, a CDN may locate caching servers in Los Angeles, Dallas, and New York. These caching servers may cache content that is published by a particular content provider with an origin server in Miami. When a requesting end user in San Francisco submits a request for the published content, the CDN will deliver the content from the Los Angeles caching server on behalf of the content provider as opposed to the much greater distance that would be required when delivering the content from the origin server in Miami. In this manner, the CDN reduces the latency, jitter, and amount of buffering that is experienced by the requesting end user. The CDN also allows the content provider to offload infrastructure costs, configuration management, and maintenance to the CDN while being able to rapidly scale resources as needed. Content providers can therefore devote more time to the creation of content and less time to the creation of an infrastructure that delivers the created content to the end users. As a result of these and other benefits, many different CDNs are in operation today. Edgecast, Akamai, Limelight, and CDNetworks are some examples of operating CDNs.

CDNs differentiate themselves on the basis of cost and performance. One area in which CDNs strive to improve in terms of cost and performance is caching. However, it is often the case that improved caching performance begets increased costs. For example, a CDN can deploy additional storage to each of its caching servers at added cost in order to increase the amount of available cache at each of its caching servers. Similarly, the CDN can deploy more expensive solid state disks (SSDs) in its caching servers instead of cheaper mechanical disk in order to improve responsiveness of its caching servers.

To avoid these tradeoffs in cost and performance, CDNs and other cache operators are continually in search of new caching techniques, devices, etc. that improve caching performance without added cost. One such area of focus is the efficiency with which existing caching servers cache content.

CDNs typically utilize first hit caching to determine when to cache content. First hit caching has been preferred because of its simplicity and relative good performance. When performing first hit caching, a caching server will retrieve requested content from an origin, pass the retrieved content to the requesting end user, and store the content to local cache when the content is requested for the first time. The next time that content is requested, the caching server will retrieve and serve the content from its local cache rather than from the origin.

However, first hit caching performance is greatly affected by caching of "long-tail" content. As a result, first hit caching yields suboptimal resource utilization. FIG. 1 illustrates the long-tail distribution of content for purposes of explaining its impact on first hit caching.

In FIG. 1, the x-axis represents content that is requested at a caching server over an interval of time. The y-axis represents the number of requests for each item of content during that interval of time. As shown, some percentage of "hot" content 110 is requested frequently and some percentage of content, also referred to as the "long-tail" content 120, is infrequently requested (i.e., once or a small number of times). A caching server performing first hit caching caches all such content the first time it is requested. In so doing, caching servers with scarce cache availability may replace hot content with long-tail content in cache. This in turn increases cache miss rates. This issue can be resolved with added cost to the caching server operator by increasing the available storage at each cache server. Doing so however introduces other inefficiencies and performance degradations that result from caching of long-tail content. Specifically, long-tail content is rarely, if ever, served from cache. Consequently, a caching server wastes resource intensive write operations to cache long-tail content and to purge long-tail content from cache when the content expires. Such extraneous write operations could potentially degrade the responsiveness of the caching server by introducing delay when having to respond to other operations. Such extraneous write operations reduce the ability of the caching server to handle greater loads. Such extraneous write operations also reduce the useful life for the storage hardware at the caching server. Specifically, mechanical disk drives are more likely to suffer mechanical failure sooner and SSDs are more likely to suffer from failing memory cells sooner when performing the extraneous writes associated with caching the long-tail content. Further still, increased disk fragmentation results at the caching server because of the additional writing and purging of the long-tail content. Such disk fragmentation has been shown to slow access to content and thereby degrade caching performance.

To avoid these and other shortcomings associated with first hit caching and, more specifically, the shortcomings associated with caching long-tail content, some CDNs have utilized second hit caching or multi-hit caching that cache content when it is requested two or more times. This avoids caching some of the long-tail content that is requested only once or a few times. However, these multi-hit caching techniques suffer from other shortcomings that reintroduce the tradeoff between performance and cost. Some such shortcomings include increased processor and memory overhead needed to track content request counts, to track when to cache content, and to track what content has been cached. For example, some existing multi-hit caching techniques store the uniform resource locators (URLs) or textual names of the content being requested in conjunction with the number of times that content is requested, thereby imposing onerous memory overhead. As another example, some existing multi-hit caching techniques identify whether content is cached or has been previously requested one or more times with a sorted list or similar structure where the searching of such a structure imposes log(n) complexity and onerous processing overhead as a result. These inefficiencies and overhead increase latency, access times, and overall responsiveness of the caching server, thus offsetting the performance gains that are realized from avoiding caching long-tail content.

Moreover, some second hit caching or multi-hit caching techniques impose added cost in the form of infrastructure modifications and additions that are needed to maintain content request counts and where content is cached. For example, United State Patent Publication 2010/0332595 entitled "Handling Long-Tail Content in a Content Delivery Network (CDN)" introduces a new server, referred to as a popularity server, into existing infrastructure to track the number of times content is requested. In addition to the added costs for deploying and maintaining the popularity server, the centralized framework also introduces performance reducing delay as a result of the communication that occurs between the caching servers and the popularity server.

Accordingly, there is a need to improve CDN performance without increased cost. One specific area of need is to improve cache performance without increasing cost and without offsetting other areas of performance. Specifically, there is a need for an optimized multi-hit caching technique that avoids the performance impact that long-tail content has on cache performance while still achieving similar performance as first hit caching in terms of identifying what content to cache and identifying whether content is cached.

SUMMARY OF THE INVENTION

It is an object of the embodiments described herein to provide an optimized multi-hit caching technique. More specifically, it is an object to minimize the effect of long-tail content on cache performance while retaining much of the efficiency and minimal overhead that is associated with first hit caching in determining when to cache content and in determining which content has been cached. Stated differently, it is an object to minimize the performance impact associated with caching of long-tail content without imposing onerous processing and memory overhead to track and identify content request counts and cached content. In satisfying these objects, it is an object to reduce (when compared to first hit caching techniques) the number of writes and purges that are performed by the caching server, thereby (1) extending the life of the computer readable storage medium of the caching server, (2) improving latency and access times of the caching server by freeing the caching server from performing extraneous write and purge operations, (3) reducing the amount of storage needed at the caching server to maintain a sufficiently high cache hit rate and a sufficiently low cache miss rate, and (4) reducing the disk defragmentation that occurs at the caching server. The optimized multi-hit caching technique is intended for execution by caching servers operating in a distributed environment such as a content delivery network (CDN) whereby each of the caching servers of the CDN can perform the optimized multi-hit caching independently without a centralized framework. It should be apparent that the optimized multi-hit caching technique is also applicable to any server that performs caching in an intranet, wide area network (WAN), internet, or with other communicably coupled set of networked devices.

In some embodiments, the optimized multi-hit caching technique performs N-hit caching whereby content is cached to a computer readable storage medium of a caching server when that content is requested N times, wherein N is an integer value greater than one. In some embodiments, the optimized multi-hit caching technique efficiently tracks the number of requests using N−1 bit arrays when performing N-hit caching. In some embodiments, the optimized multi-hit caching technique is interval restricted such that content is cached when the requisite number of requests for that content is received within a particular specified interval. Such N-hit interval restricted caching avoids much of the performance impact that is associated with caching of long-tail content, where long-tail content is content that is requested less than N times during the particular specified interval. The performance impact associated with caching long-tail content includes (1) greater utilization of the computer readable storage medium thereby necessitating that each caching server be deployed with a larger storage medium or be subject to greater thrashing (content replacement), (2) increased load on the caching server as a result of having to perform additional write and purge operations to cache the long-tail content, (3) less uptime for the caching server as the storage medium of the caching server is more likely to suffer failure because of greater utilization, and (4) decreased performance for the caching server as a result of greater disk fragmentation.

To simplify the discussion, the optimized multi-hit caching technique will be described by example of a second hit caching implementation that is interval restricted. To efficiently implement such second hit caching and avoid much of the processing and memory overhead associated with tracking the number of times content has been requested and performing the lookup associated therewith, some embodiments utilize hashing in conjunction with a single-bit bit array or bitmap. For an N-hit implementation of the optimized caching technique, N−1 bit arrays may be used.

In some embodiments, the optimized caching technique is performed when a request for content (i.e., content request) is received at a caching server. A lookup in cache determines if the requested content is already cached. If so, the content is served from cache. Otherwise, hashing is performed to convert an identifier that is extract from the content request (e.g., filename, URL, etc.) into a set of bit indices that uniquely identify the content request according to the positions of the produced bit indices in the bit array. More specifically, the caching server extracts from the content request an identifier for identifying the content being requested. The caching server uses the extracted identifier as input to each hash function of a set of hash functions. Each hash function produces an index at a particular position of the bit array and the collective set of produced indices and their corresponding positions in the bit array uniquely represent the content being requested. Each produced index is then compared with indices previously entered in the bit array. When the corresponding bit array indices representing the requested content are not set in the bit array, the bit array identifies the content request as the first request or first hit for such content. Accordingly, the requested content is retrieved from an origin and served to the requestor without caching to avoid caching on the first hit. The bit array indices representing the requested content are also populated in the bit array to record the first hit for such content. When the corresponding bit array indices representing the requested content are already set in the bit array, the requested content is retrieved from an origin, forwarded to the requestor, and cached as the current request will be indicative of the second request or second hit for the content. In some embodiments, a second bit array is used in conjunction with second hit caching to efficiently perform the lookup in cache.

As noted above, the optimized multi-hit caching is interval restricted in some embodiments to further mitigate the performance impact that is associated with caching long tail content. This is because in traditional multi-hit caching techniques that are not interval restricted, the Nth hit to cache the long-tail content is an eventuality and given an infinite duration, such traditional multi-hit caching techniques will receive the Nth request for the long-tail content and therefore cache the long-tail content. By restricting the interval with which the requisite Nth hit occurs before caching content, the effectiveness of multi-hit caching in avoiding the performance impact associated with long-tail content is increased. Specifically, the multi-hit caching is optimized to define long-tail content in terms of at least two dimensions that include 1) a requisite number of N hits and 2) a particular specified duration. For example, given a ten second interval and second-hit caching, the optimized multi-hit caching technique caches content that is requested at least twice during a particular ten second interval. Content that is requested less than two times in each ten second interval is considered long-tail content. To restrict the interval for the optimized multi-hit caching technique, some embodiments flush or clear the bit array at periodic intervals or upon defined events.

Using the bit indices to represent requested content eliminates much of the onerous memory overhead that is associated with storing URLs, filenames, or other identifiers for the requested content. The bit array in conjunction with the bit array indices representing requested content allows the hit count for all content requests to be tracked using a single fixed sized storage structure. Moreover, hashing enables searching of the bit array in constant time to determine if requested content has not yet been requested or has been requested at least once.

The hashing and bit array are consistent with a standard bloom filter implementation. However, the standard bloom filter is not suited for purposes of content caching. This is because the standard bloom filter, or more specifically the array of the standard bloom filter, does not provide functionality to remove indices representing one particular piece of content from the array without affecting identification of other content that may be represented with one or more indices overlapping with the indices representing the particular piece of content. As the array of the standard bloom filter is continually populated with new indices and stale indices are not removed, the ratio of false positives increases, thereby lessening the accuracy and effectiveness with which the standard bloom filter identifies content request counts over time. Furthermore, simply flushing the array of the standard bloom filter causes request counts for relevant or actively monitored content to be lost in addition to request counts for stale or expired content. This loss of information can lead to N+1 hit caching when N-hit caching is being performed.

Accordingly to perform the optimized multi-hit caching using a set of hash functions with at least one bit array that is interval restricted and periodically flushed, some embodiments implement a proprietary modified bloom filter. The modified bloom filter, also referred to as a rolling flushed bloom filter, stores a copy of the bit array prior to flushing or clearing each of the indices of the bit array at specified intervals. A copy of the bit array is made to avoid losing track of content that was requested during the previous interval. In some such embodiments, the bit indices representing requested content are thus compared against a previous copied state of the bit array and a current state of the bit array (1) to avoid caching of long-tail content that is not requested a requisite number of times during the previous and current intervals, (2) to ensure the effectiveness of the bit array in accurately representing content request counts by reducing the possibility of a false positive by flushing stale bit indices representing long-tail content from the bit array, and (3) to avoid the potential for N+1 hit caching.

Some embodiments of the optimized multi-hit caching technique further incorporate tiered caching to negate the load increase that an origin would otherwise experience when performing N-hit caching in place of first hit caching. The optimized multi-hit caching with tiered caching uses a first cache tier that performs the optimized multi-hit caching using the modified bloom filter and a second cache tier that performs first hit caching. In this manner, optimized multi-hit caching is performed to avoid the performance impact of long-tail content with the load to the origin being the same as what the origin would experience if only first hit caching was performed.

Some embodiments implement the different caching tiers within a single server. To efficiently track when to cache content to the different caching tiers or to efficiently lookup which caching tier content is cached to, some embodiments utilize one or more counting bloom filters.

In one such implementation, a different pair of counting bloom filters is configured for each caching tier. For each counting bloom filter pair configured for a particular caching tier, a first counting bloom filter of the pair tracks the number of times that content cached to that particular caching tier is requested in a current interval and a second counting bloom filter of the pair tracks the number of times that content cached to that particular caching tier was requested in a previous interval with the pair of counting bloom filters being rolled and flushed whenever the interval expires. Each caching tier is also configured with a threshold value. The threshold value for a particular caching tier is indicative of a certain number of requests before content that is cached to that particular caching tier is moved to a next higher caching tier.

When content is moved from a first caching tier to a second caching tier as a result of exceeding the threshold request count set for the first caching tier, the request counts for that content are moved from the first caching tier counting bloom filters to the second caching tier counting bloom filters. The second caching tier counting bloom filters will then be used to track future requests for the content until the content is again moved to a different caching tier or is purged from cache.

The pairs of counting bloom filters also identify where in the caching tier hierarchy content is cached. When an incoming request is received, the unique set of indices identifying the requested content is used to query the pair of counting bloom filters for the different caching tiers. The queries may be performed sequentially started from the uppermost caching tier to the lowest caching tier. Alternatively, the queries can be conducted in parallel.

If each index of the set of indices is set in the pair of counting bloom filters for a particular caching tier, a stat call is made to that particular caching tier to determine if the requested content is in fact cached therein. If a cached instance of the content is found, the content is retrieved and served to the requestor without further querying of the other caching tiers. If the stat call reveals that the content is not in fact cached in the identified caching tier, stat calls are then issued to the other caching tiers until the content is identified or is retrieved and passed from an origin. In some embodiments, when content is purged from a particular caching tier, the minimum value for the unique set of indices identifying that content in the pair of counting bloom filters configured for that particular caching tier is decremented from the corresponding indices of the counting bloom filters.

In another implementation, a single counting bloom filter tracks the request counts for content cached to any caching tier within the caching tier hierarchy. Associated with the single counting bloom filter is a table identifying a threshold number of requests for caching content to each of the caching tiers. Accordingly, when a request for particular content is received, the identifier for the particular content is hashed to obtain the set of indices that uniquely identify the particular content within the single counting bloom filter. The minimum value set for the set of indices in the single counting bloom filter then determines a request count for the particular content. A lookup of the request count in the table is then made to identify in which caching tier the particular content is cached. A stat call is made to the identified caching tier to verify the particular content is cached therein. If so, the particular content is retrieved and passed to the requestor. Otherwise, a false positive has been identified in the bloom filter and in response, stat calls are made to each lower level caching tier until the particular content is found or is retrieved from an origin. The set of indices are then incremented in the single counting bloom filter to determine whether the content should be moved within the caching tier hierarchy. The single counting bloom filter is not flushed or otherwise reset until content is purged from cache. When content is purged, the counts for the purged content are decremented from the single counting filter.

In still another implementation, three counting bloom filters are used to track content in the caching tier hierarchy. A pair of the counting bloom filters track request counts receiving during a fixed interval. These bloom filters are rolled and flushed at the expiration of the interval. The third bloom filter however is not reset and is used to identify where in the caching tier hierarchy different content is cached. The third bloom filter is decremented as content is purged from the caching tier hierarchy.

BRIEF DESCRIPTION OF THE DRAWINGS

In order to achieve a better understanding of the nature of the present invention, preferred embodiments for multi-hit caching will now be described, by way of example only, with reference to the accompanying drawings in which.

DETAILED DESCRIPTION

In the following detailed description, numerous details, examples, and embodiments for systems and methods for optimized multi-hit caching are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

Figure 2:
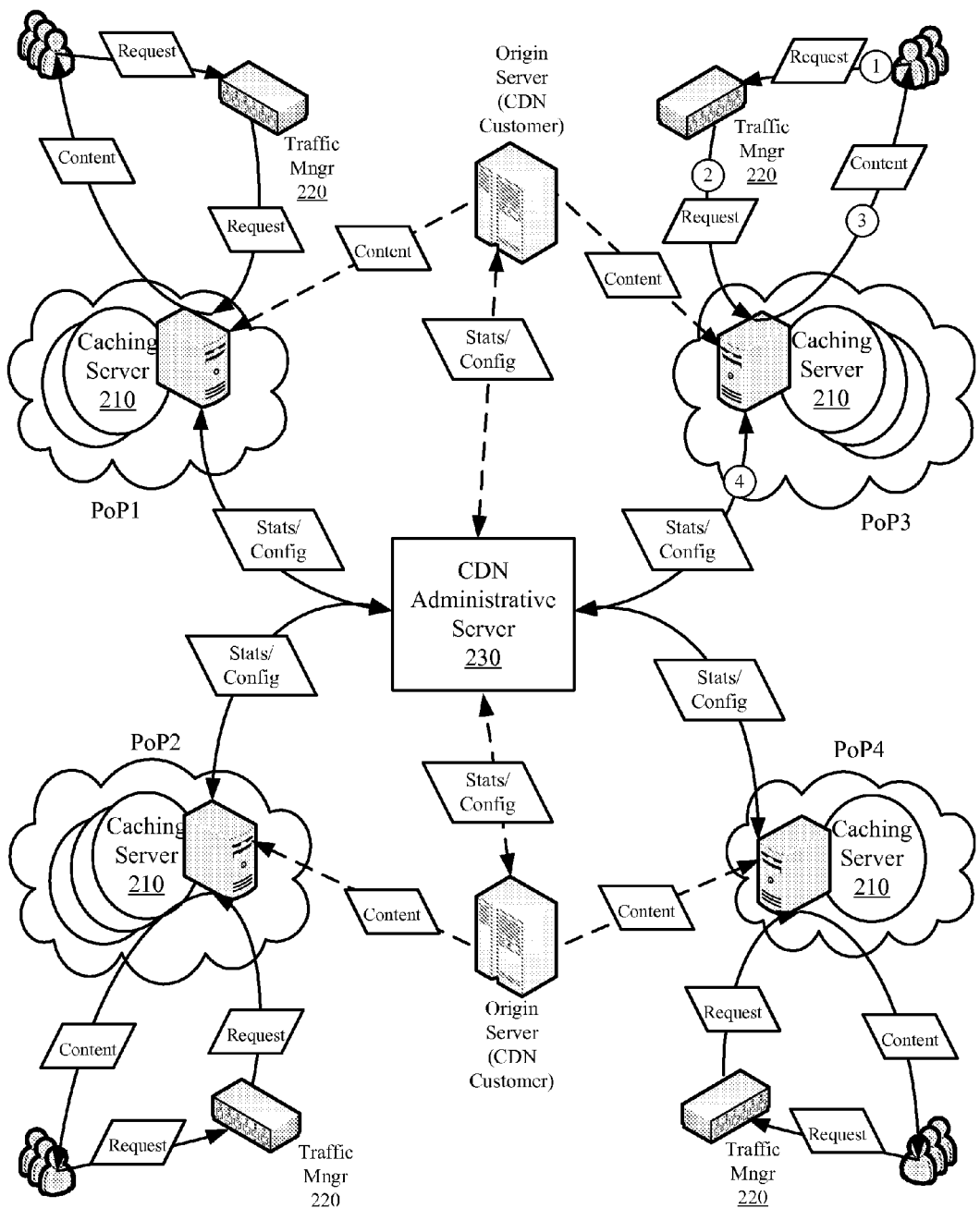
FIG. 2 presents an exemplary CDN infrastructure.

To aid in the discussion below, an overview for a distributed environment in which multi-hit caching is to be performed is presented in FIG. 2. FIG. 2 presents an exemplary CDN infrastructure that includes a distributed set of caching servers 210, traffic management servers 220, and an administrative server 230. The figure also illustrates the interactions that CDN customers including content providers have with the CDN and interactions that content consumers or end users have with the CDN.

Each caching server of the set of caching servers 210 may represent a single physical machine or a cluster of machines that serves content on behalf of different content providers to end users. The cluster of machines may include a server farm for a geographically proximate set of physically separate machines or a set of virtual machines that execute over partitioned sets of resources of one or more physically separate machines. The set of caching servers 210 are distributed across different edge regions of the Internet to facilitate the "last mile" delivery of content. Each cluster of servers at a particular region may represent a point-of-presence (PoP) of the CDN, wherein an end user is typically routed to the closest PoP in order to download content from the CDN with the goal of reducing the time needed to deliver the content to the end user. Each caching server of the set of caching servers 210 may independently execute the optimized multi-hit caching technique described below in order to determine when and what content to cache. Each caching server may further execute one or more cache replacement policies to determine when to purge cached content. Execution of the optimized multi-hit caching technique may also be performed at the PoP level, whereby each of the subset of caching servers operating in the PoP collectively performs the optimized multi-hit caching technique.

The traffic management servers 220 route end users, and more specifically, end user issued requests for content to the one or more caching servers. Different CDN implementations utilize different traffic management schemes to achieve such routing to the optimal caching servers. As one example, the traffic management scheme performs Anycast routing to identify a server from the set of servers 210 that can optimally serve requested content to a particular end user requesting the content. It should be apparent that the traffic management servers 220 can include different combinations of Domain Name System (DNS) servers, load balancers, and routers performing Anycast or Border Gateway Protocol (BGP) routing.

The administrative server 230 may include a central server of the CDN or a distributed set of interoperating servers that perform the configuration control and reporting functionality of the CDN. Content providers register with the administrative server 230 in order to access services and functionality of the CDN. Accordingly, content providers are also referred to as customers of the CDN. Once registered, content providers can interface with the administrative server 230 to specify a configuration, upload content, and view performance reports. The administrative server 230 also aggregates statistics data from each server of the set of caching servers 210 and processes the statistics to produce usage and performance reports. From these reports, the content provider can better understand the demand for its content, the performance provided by the CDN in delivering the content provider's content, and the need for capacity reallocation, among other uses.

I. Multi-Hit Caching

Figure 1:
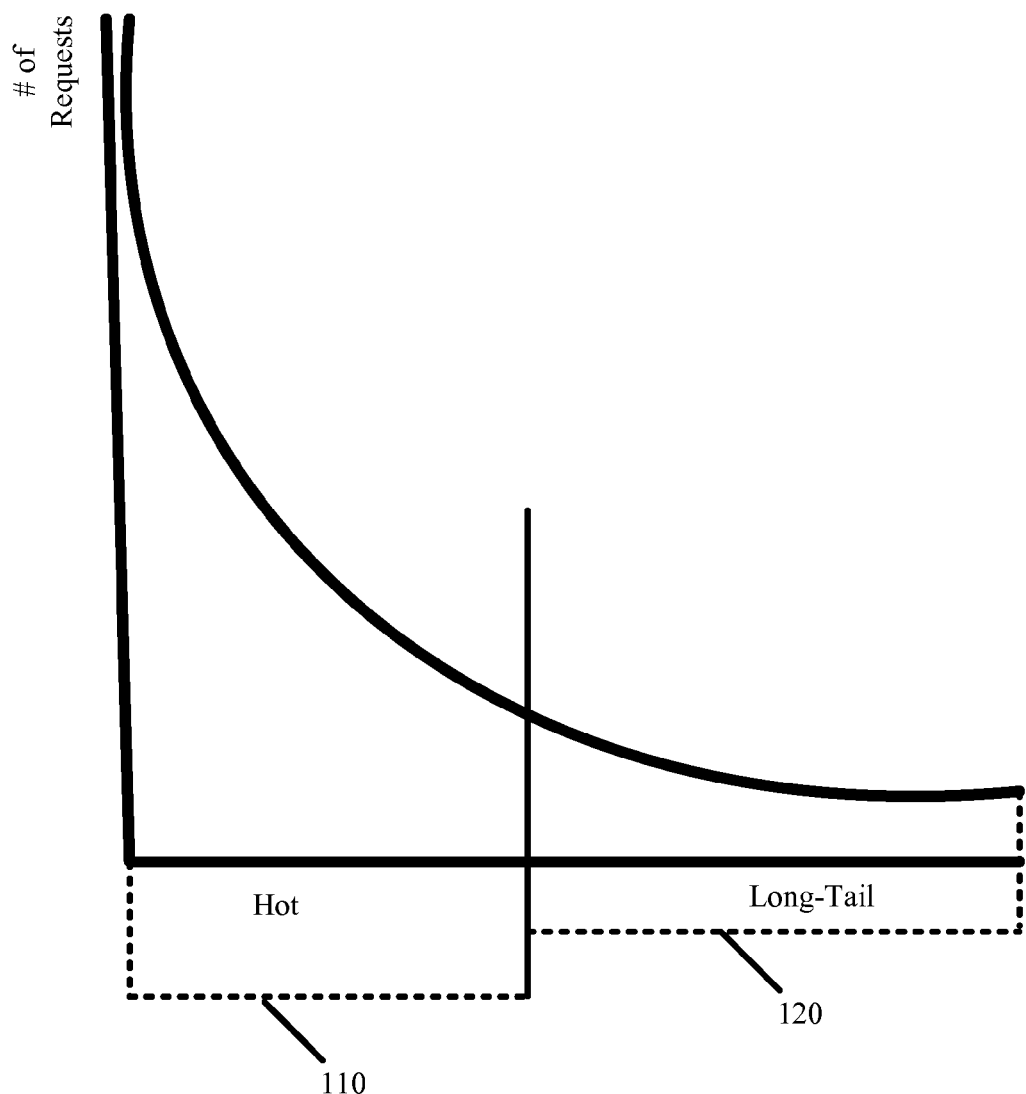
FIG. 1 illustrates the long-tail distribution of content for purposes of explaining its impact on first hit caching.

Some embodiments provide optimized multi-hit caching for a caching server to reduce the performance impact that results when caching content that is requested once or infrequently in a specified interval, otherwise referred to as long-tail content (see FIG. 1). In some embodiments, the optimized multi-hit caching is implemented in a distributed fashion such that each caching server performs the optimized multi-hit caching without interdependence on other caching servers and without the added expense and overhead that is associated with a centralized framework in which a central server tracks content hit counts, where content is cached, etc. Moreover, the optimized multi-hit caching is implemented with a processing and memory footprint and access times similar to that of first hit caching techniques. A caching server executing the optimized multi-hit caching can include an independent operating cache such as a proxy, a caching server of a distributed set of caching servers such as the edge servers of a CDN, or any server that provides caching in an intranet, wide area network (WAN), internet, or with other communicably coupled set of networked devices.

The optimized multi-hit caching technique achieves several advantages over first hit caching. Firstly, caching capacity at each of the caching servers running the optimized multi-hit caching technique is effectively increased without altering the physical storage of the caching servers. This result occurs as a result of more efficient allocation of the existing storage. More specifically, less of the existing storage is consumed to cache long-tail content that is rarely, if ever, served from cache. Consequently, the same caching server can be deployed with less physical storage or can support caching of more "hot" content. Secondly, the resource utilization of the caching server is reduced making it more responsive and able to handle greater loads without added resources. Resource utilization is reduced because the caching server performs fewer resource intensive write operations as a result of not having to cache long-tail content. Resource utilization is also reduced because the caching server performs fewer purge operations as a result of not having to remove long-tail content from cache upon expiration, purging, or replacement, wherein each removal operation may be as resource intensive as a write operation. Thirdly, by avoiding the extraneous writes and purges associated with the caching of long-tail content, the useful life of the storage medium at the caching server is increased. Specifically, the storage medium is less likely to suffer from mechanical failure or memory errors when it performs fewer write and purge operations. Consequently, the storage medium has to be replaced less frequently, yielding cost savings and less downtime to the caching server operator. These costs savings are of greater value when the storage medium is a more expensive solid state disk than a less expensive mechanical disk. Fourthly, by avoiding the extraneous writes and purges associated with the caching of long-tail content, the caching server is less affected by the performance degradation that results from disk fragmentation. Furthermore, these advantages are realized with little to no affect in end user perceived performance as only a negligible fraction of end users would receive requested content from an origin instead of from cache when using the optimized multi-hit caching instead of first hit caching.

As will become apparent from the detailed implementation described below, the optimized multi-hit caching technique of the embodiments presented herein is distinguishable from and preferred to traditional second hit or multi-hit caching techniques. In contrast to other multi-hit caching techniques, the implementation for the optimized multi-hit caching technique requires a minimal memory footprint which allows the caching server to perform cache management wholly within faster main memory. This minimal memory footprint primarily results from the ability to determine request counts using a fixed sized bit array when performing second hit caching and N−1 fixed sized bit arrays when performing N hit caching. This is in contrast to other multi-hit caching techniques that consume large amounts of memory as a result of cataloging filenames, URLs, and other descriptive information in combination with request counts. Moreover, the optimized multi-hit caching technique requires minimal processing overhead to encode to and from the bit array(s). The optimized multi-hit caching technique utilizes hashing in its implementation to achieve constant time lookups for cache hit counts from the bit arrays. Specifically, each of the bit arrays can be searched in parallel to perform a constant time hit count lookup irrespective of the number of bit arrays used and on what hit count caching is to be performed. As a result, the optimized multi-hit caching technique is able to achieve comparable performance to first hit caching without suffering from the performance impact that caching long-tail content has on first hit caching.

To simplify the discussion to follow, the optimized multi-hit caching is described with reference to an interval restricted second hit caching implementation, whereby content is cached at a caching server when it is requested for a second time in a specified interval. However, it should be apparent that the optimized multi-hit caching can be adapted for interval restricted N-hit caching, whereby content is cached at a caching server when it is requested for the Nth time in the specified interval. In some embodiments, the specified interval determines when to flush the bit array that tracks content request counts. In some embodiments, the specified interval is determined based on a percentage of bit indices that are set in the bit array or based on a recurring period of time. In some embodiments, the caching server operator can control each of the period or trigger for the specified interval and the requisite number of hits before caching content in an interval. Using these variables, the caching server operator can control what content is classified as long-tail content that should not be cached and what content is classified as "hot" content that should be cached.

Figure 3:
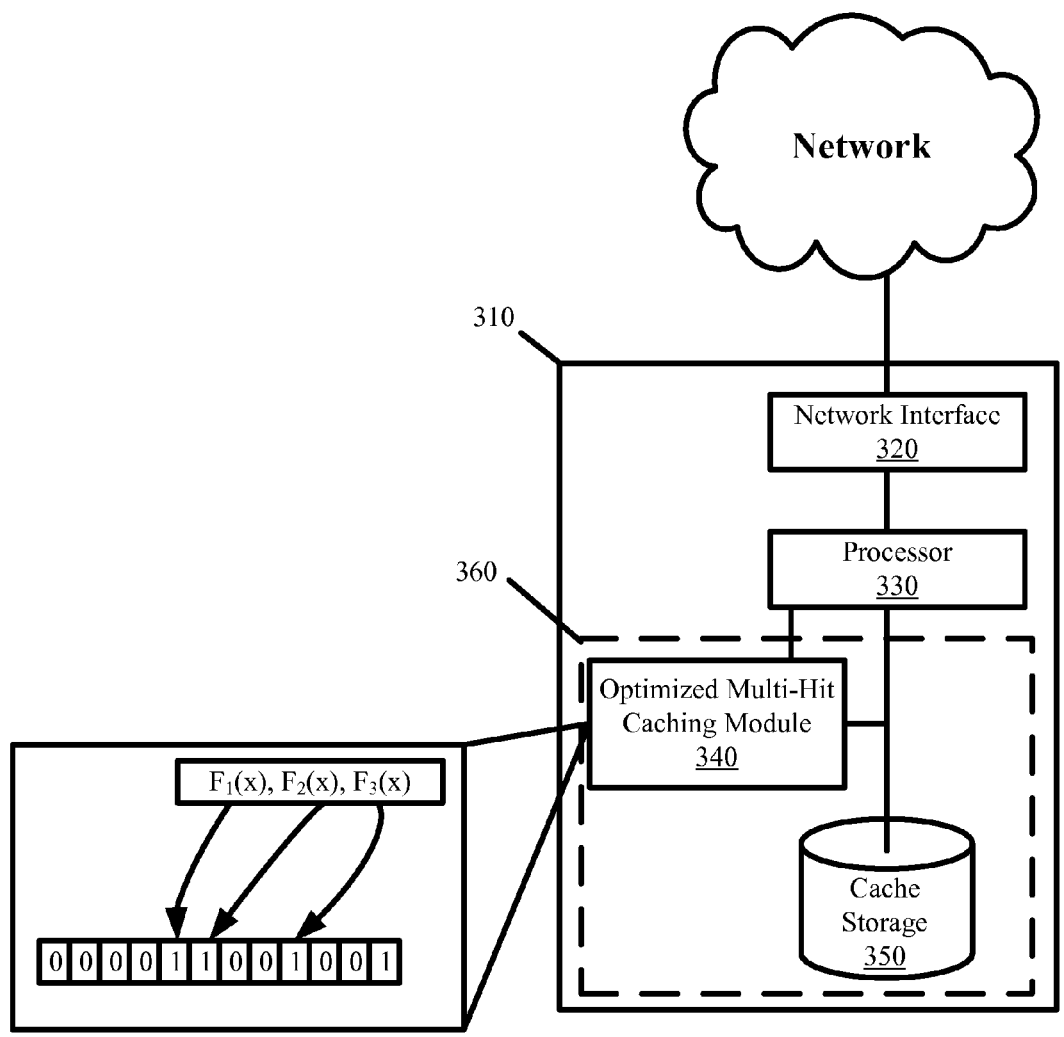
FIG. 3 illustrates components for a caching server that is enhanced to perform the optimized multi-hit caching in accordance with some embodiments.

FIG. 3 illustrates components for a caching server 310 that is enhanced to perform the optimized multi-hit caching in accordance with some embodiments. The caching server 310 includes network interface 320, processor 330, optimized multi-hit caching module 340, and cache storage 350. The optimized multi-hit caching module 340 and cache storage 350 reside in computer readable storage medium 360 of the caching server 310. As will be described below, the computer readable storage medium 360 can comprise any one or more of volatile and non-volatile storage including random access memory, solid state storage, and mechanical disk storage.

The network interface 320 is the means with which the caching server 310 communicates with other network enabled devices. The network interface 320 implements the communication protocols and protocol stacks to enable such communication across different networks including intranets, the Internet, wide area networks (WANs), local area networks (LAN), etc. In a preferred embodiment, the network interface 320 is an Ethernet interface that sends and receives communications using the IP network protocol.

The processor 330 is the decision making component of the caching server 310 which performs caching according to the optimized multi-hit caching module 340. The processor 330 may include any commercially available processor such as those manufactured by Intel® or AMD®.

The optimized multi-hit caching module 340 contains computer executable instructions that when executed by the processor 330 determine when and what content to cache. Accordingly, the optimized multi-hit caching module 340 is the component defining operation for the multi-hit caching technique described herein. The optimized multi-hit caching module 340 may be stored to the computer readable storage medium 360 and loaded from the computer readable storage medium 360 wholly into main memory (not shown) during execution by the processor 330. As conceptually depicted, the optimized multi-hit caching module 340 is encoded with a set of hashing functions and at least one bit array to facilitate the tracking of content requests and whether requested content should be cached to the cache storage 350. In some embodiments, the optimized multi-hit caching module 340 is also encoded with other caching algorithms that operate in accordance with the optimized multi-hit caching technique. Some such caching algorithms include cache replacement policies, such as the least recently used (LRU) or most recently used (MRU) cache replacement policies that control when cached content is to be purged from the cache. The integration of the optimized multi-hit caching module 340 with the other components of the caching server 310 transform the caching server 310 to a special purpose machine that performs caching according to the proprietary methods described herein. Specifically, the integration of the optimized multi-hit caching module 340 causes the caching server 310 to optimally perform multi-hit caching while avoiding the performance impact associated with caching of long-tail content.

The cache storage 350 is an allocated section of the computer readable storage medium 360 that is used to cache content for accelerated dissemination of content to end users. The accelerated dissemination is achieved based on greater geographic proximity between the caching server and the requesting end user than between the origin (i.e., source content provider) and the requesting end user. The accelerated dissemination may also be achieved when the caching server has greater bandwidth and greater resources to serve the content to the requesting end user than the origin. The content cached to the cache storage 350 can include static, dynamic, interactive, and multimedia content. In other words, the cached content can include web pages, text, audio, images, and video as some examples.

Figure 4:
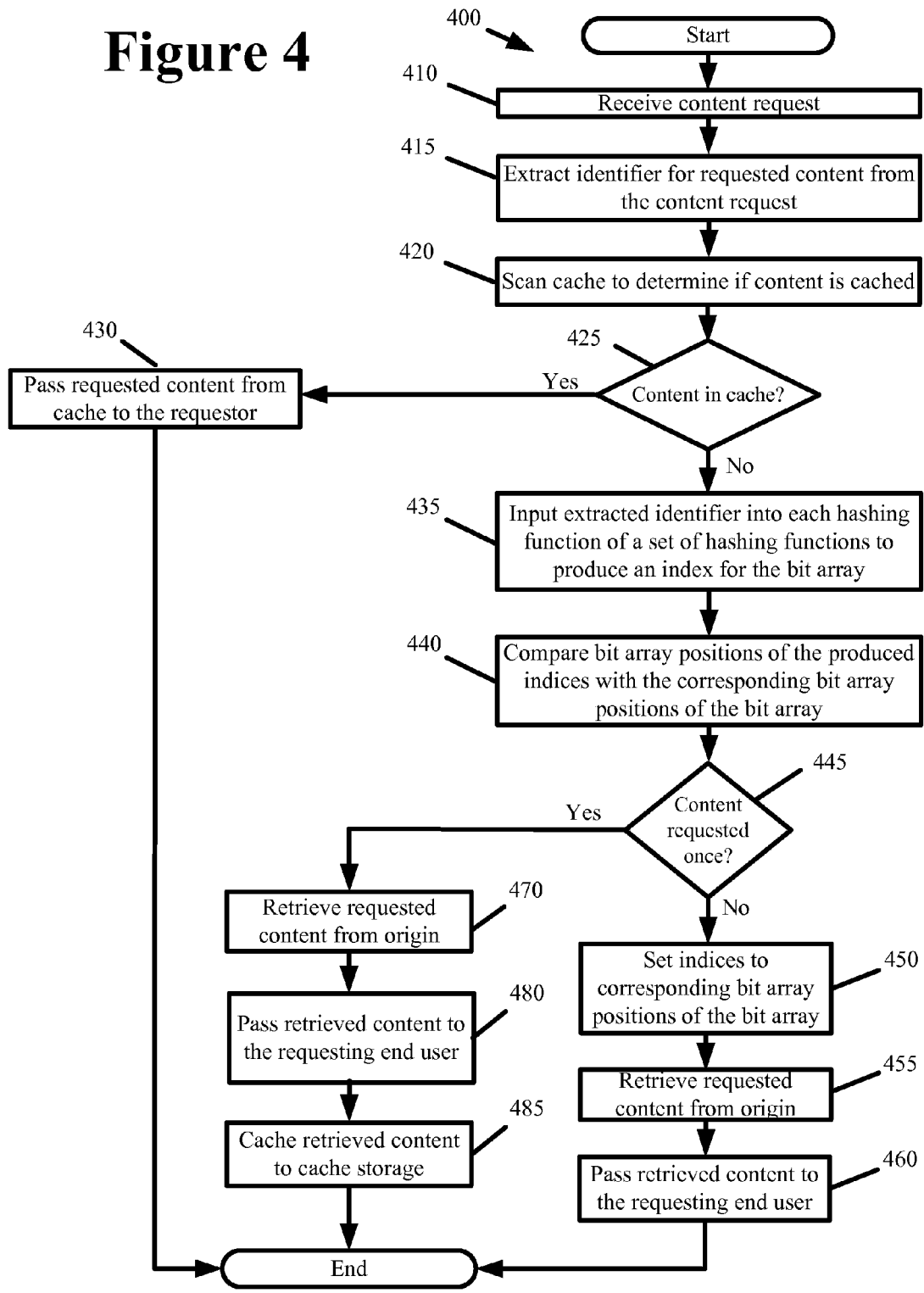
FIG. 4 presents a process executed by the caching server when performing the optimized multi-hit caching using the set of hashing functions and the bit arrays of the optimized multi-hit cache module in accordance with some embodiments.

FIG. 4 presents a process 400 executed by the caching server 310 when performing the optimized multi-hit caching using the set of hashing functions and the bit array of the optimized multi-hit cache module 340 in accordance with some embodiments. The process 400 begins when the caching server receives (at 410) a content request over the network interface. The content request may be encoded using any standard or proprietary messaging protocol. As one example, content requests may be encoded as HyperText Transfer Protocol (HTTP) GET requests.

The process parses the content request to extract (at 415) an identifier that identifies the content being requested. Depending on the format of the content request, the identifier may be found in the header of the packet encapsulating the content request. The identifier may include a name for the content being request (i.e., filename). The identifier may alternatively or additionally include a full path for the content being request. The full path can include any fully qualified domain name, hyperlink, URL, or other path for the content being requested.

The process scans (at 420) the cache of the caching server to determine (at 425) whether the content being requested has previously been stored to cache. In some embodiments, scanning the cache involves performing a disk access to determine if the content is stored to the computer readable storage medium of the caching server.

When the requested content is found in cache, the process passes (at 430) the requested content from cache to the requesting end user. Otherwise, the process inputs (at 435) the extracted identifier into each hashing function of the set of hashing functions. Each hashing function produces an index and position for the bit array, where the collective set of bit array positions of the produced indices represent the content in an encoded format. The process then compares (at 440) the bit array positions of the resulting indices with the corresponding bit array positions of the bit array to determine (at 445) if the content currently being requested was requested at least once before.

When one or more of the bit array positions for the hash function produced indices are not set in the bit array, it is an indication that the content being requested was not requested at least once before. Accordingly, the process sets (at 450) the bit array positions for the produced indices in the bit array to record the first hit for the requested content. The process retrieves (at 455) the requested content from the origin and passes (at 460) the retrieved content to the requesting end user.

When all of the bit array positions for the hash function produced indices are set in the bit array, it is an indication that the content being requested was requested at least once before. In such cases, the process retrieves (at 470) the requested content from the origin, passes (at 480) the retrieved content from the origin to the requesting end user, and caches (at 485) the content to cache storage so that future requests for the same content can be satisfied from cache without accessing the origin.

As will be appreciated by one of ordinary skill in the art, the origin represents one or more network enabled servers that store a copy of the requested content. The origin servers may be operated by content providers that originate such content. The origin servers may alternatively be operated by any third party that hosts content on behalf of such content providers. Furthermore, in some embodiments, the process hashes the identifier associated with the requested content before scanning the cache to determine whether the content being requested has been stored to cache. In some such embodiments, the optimized multi-hit caching technique utilizes a second bit array to track whether content has been requested at least twice and is therefore stored to cache. When using a second bit array, the lookup to cache can be performed by comparing the bit indices representing the requested content with the corresponding positions of the second bit array.

The second hit caching performed by process 400 is efficiently implemented because of the relatively low memory requirements needed to store the fixed size single-bit bit array and the little processing overhead and constant time needed to perform and resolve the hashing in order to determine whether content was requested at least once before. Process 400 avoids the performance impact that is associated with caching long-tail content, and more specifically, the performance impact that is associated with caching content that is requested once. The optimized multi-hit caching can be modified with N−1 bit arrays to perform N-hit caching to avoid the performance impact that is associated with caching long-tail content that is requested less than N times.

However, given a sufficiently long or infinite duration of time, it is reasonable to expect that all hosted content will be requested N times and will therefore be cached. Accordingly in some embodiments, the optimized multi-hit caching technique is interval restricted such that content is cached when the requisite number of requests for that content is received within a particular specified interval (i.e., N hits for N-hit caching). By altering this interval and by setting the N-hit count value, the caching server operator can control how much content is discarded as long-tail content and how much content is cached as "hot" content. For example, the caching server operator can set the optimized multi-hit caching to perform second hit caching in a ten second interval. In this example, content that is requested twice within the ten second interval is classified as "hot" content that should be cached and content that is not requested at least twice within the ten second interval is classified as long-tail content that should not be cached. By restricting the interval, the optimized multi-hit caching technique efficiently adapts second hit caching (e.g., with minimal processing and memory overhead) to avoid the performance impact that is associated with caching long-tail content, wherein the long-tail content is defined to include content that is requested less than two times in the specified interval. More generally, by restricting the interval and N-hit count required for caching, the optimized multi-hit caching technique efficiently avoids the performance impact that is associated with caching long-tail content, wherein the long-tail content is custom defined by the caching server operator according to at least two dimensions: 1) the specified number of N-hits and 2) the duration for the specified interval in which the N-hits are to occur in order to cache content.

To facilitate the discussion for implementing the interval restricted multi-hit caching technique, an introduction to bloom filters is now provided. Specifically, the above described hashing functions and bit array are consistent with those used to implement a standard bloom filter. As is well known in the art, a bloom filter guarantees that no false negatives will be identified. However, there is a slight probability for a false positive. A false negative identifies that an element is not within a set when the element is actually in the set. A false positive identifies that an element is within a set when the element is actually not in the set. When applied to caching, a false positive in the bit array falsely identifies that a particular item of content was requested at least once when in actuality it had not been requested. Such a false positive can therefore lead to falsely identifying that content should be cached.

Figure 5:
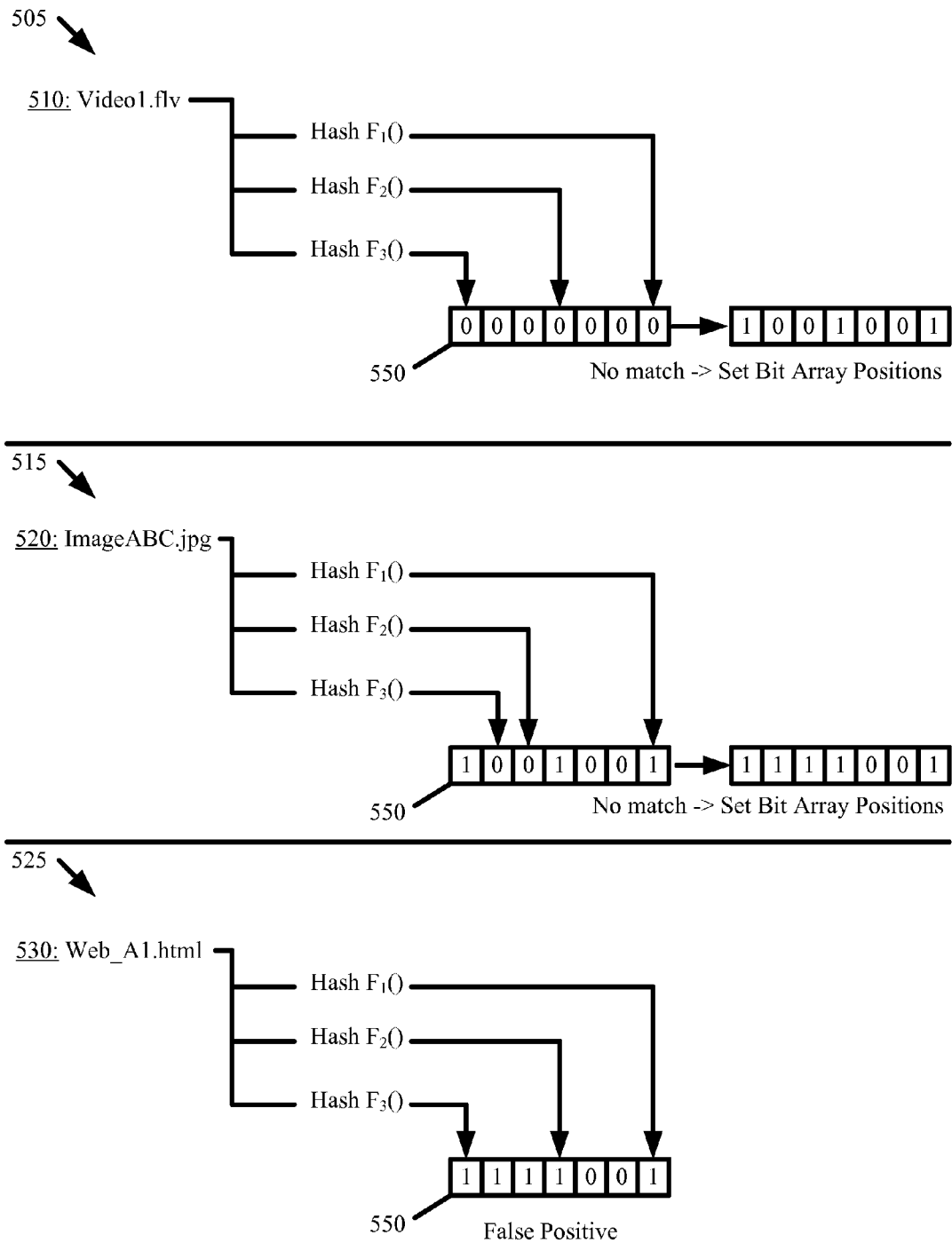
FIG. 5 conceptually illustrates how false positives can result when using standard bloom filters.

FIG. 5 conceptually illustrates how false positives can result when using standard bloom filters. The figure illustrates a first stage 505, a second stage 515, and a third stage 525. The false positive occurs in the third stage 525.

As shown at 505, a first content identifier 510, "Video1.flv", is identified from a request for a first item of content. The first content identifier 510 is hashed by three hash functions to produce indices in the first, fourth, and seventh positions of the bit array 550 (1001001). The bit array 550 is examined to determine if these bit positions are already set as an indication as to whether or not the first content identifier 510 was previously requested. Since none of the bit positions in the bit array 550 are set, the bit array 550 correctly identifies that the first content identifier 510 has not yet been requested and the produced indices are set in the bit array 550 to record the first hit for the first content identifier 510.

As shown at 515, a second content identifier 520, "Image-ABC.jpg", is identified from a request for a second item of content. The second content identifier 520 is hashed by the three hash functions to produce indices in the second, third, and seventh positions of the bit array 550 (0110001). The bit array 550 is examined to determine if these bit positions are already set as an indication as to whether or not the second content identifier 520 was previously requested. Since at least one of the positions (i.e., second and third bit positions) in the bit array 550 is not set, the bit array 550 correctly identifies that the second content identifier 510 has not yet been requested and the produced indices are set in the bit array 550 to record the first hit for the second content identifier 520

As shown at 525, a third content identifier 530, "Web_A1.html", is identified from a request for a third item of content. The third content identifier 530 is hashed by the three hash functions to produce indices in the first, second, and third positions of the bit array 550 (1110000). The bit array 550 is examined to determine if these bit positions are already set as an indication as to whether or not the third content identifier 520 was previously requested. In this instance, the bit array produces a false positive that incorrectly suggests that the third content identifier 530 was previously requested. The false positive occurs due to the index representations for the first and second content identifiers 510 and 520 overlapping with the index representation for the third content identifier 530.

The probability of a false positive can be reduced by increasing the size of the bit array. When used in conjunction with caching content, the optimal size for the bit array is a factor of the quantity of expected cacheable content and the number of hashing functions. Specifically, the probability of a false positive is determined using the formula:

$$p=(1-e^{((-k*n)/m)})^k \quad (1)$$

In the above formula, p is the probability, k is the number of hash functions, m is the number of bits in the array, and n is the number of inserted elements or quantity of expected cacheable content. A CDN can estimate the value for n based on log analysis over one or more time series. Alternatively, a CDN can estimate the value for n based on the amount of content it has contracted to host on behalf of various content providers. A second formula can be used to determine the optimal number of hash functions or the optimal number for k:

$$k=(m*\log(2))/n \quad (2)$$

However, the standard bloom filter is less than ideal for purposes of content caching. This is because the standard bloom filter, or more specifically the array of the standard bloom filter, lacks functionality to remove indices representing one particular piece of content from the bit array without affecting identification of other content that may be represented with one or more indices overlapping with the indices representing the particular piece of content. As the array of the standard bloom filter is continually populated with new indices and stale indices are not removed, the ratio of false positives increases, thereby lessening the accuracy and effectiveness with which the standard bloom filter identifies content request counts over time. For example, with reference to stage 525 of FIG. 5, it is not possible to remove the indices representing the first identifier 510 without removing an index (see the seventh index in the bit array) for each of the second identifier 520 and the third identifier 530. A sufficiently high false positive probability will incorrectly indicate that certain content was previously requested when it was not. This in turn causes the content to be cached after the first hit. In so doing, the above described advantages for performing multi-hit caching using hashing and a bit array is lost as the multi-hit caching technique effectively reverts back to first hit caching which then reintroduces the performance impact associated with caching of long-tail content.

II. Multi-Hit Caching Optimizations

A. Flushing with State Rolling

Some embodiments utilize a proprietary modified bloom filter to implement the interval restricted multi-hit caching in a manner that retains the memory and processing efficiency associated with a standard bloom filter and in a manner that retains the effectiveness of the bit array over time without loss of state information, thereby overcoming the shortcomings of the standard bloom filter for use in performing content caching. In some embodiments, the proprietary modified bloom filter implementation combines flushing of the bloom filter with state rolling. The implementation is hereinafter referred to as the rolling flushed bloom filter.

Flushing a bit array involves periodically clearing the bit indices of the bit array. Clearing the bit array controls the frequency with which a particular item of content needs to be requested N times in order to be classified as "hot" content or long-tail content. Stated differently, clearing the bit array controls the frequency with which a particular item of content needs to be requested N times in order to be cached. For example, more content will be classified as long-tail content when performing second hit caching using a ten second flushing interval than when performing second hit caching using a one minute interval, because the likelihood of content being requested N times for N-hit caching in the ten second interval is less than the likelihood of content being requested N times for N-hit caching in the one minute interval. Flushing also reduces the potential for identification of a false positive from the bit array, thereby increasing or maintaining the effectiveness of the bit array in identifying content request counts. In some embodiments, the bit array for the modified bloom filter is flushed at regular intervals or when specified events occur. For example, the bit array may be flushed at times when the caching server experiences low load, the caching server invokes a cache replacement policy to expire, purge, or replace content from the cache, or some specified percentage of the bit indices of the bit array is set (e.g., 20% of the bit indices of the bit array is set).

However, flushing the bit array has the undesired effect of removing content request counts for content that is actively being monitored. Accordingly, some embodiments of the optimized multi-hit caching perform state rolling in addition to flushing to allow removal for the bit array representations of stale or expired content from the bit arrays while still being able to track content request counts for content that is actively being monitored.

State rolling involves retaining the last state of the bit array before flushing the bit array and using the previous state in conjunction with the current state of the bit array to remove bit indices for stale or expired content without affecting bit indices for actively requested content. In some such embodiments, the interval for the receiving N requests to cache content when performing N-hit caching is defined to include a current interval and a previous interval, where the current interval is represented by the current state of the bit array and the previous interval is represented by the previous state of the bit array. For example, when performing second hit caching in a ten second interval, the previous interval is defined to include the first five seconds of the ten second interval and the current interval is defined to include the last five seconds of the ten second interval. Accordingly, content is cached when the content is requested at least twice in ten seconds.

Figure 6:
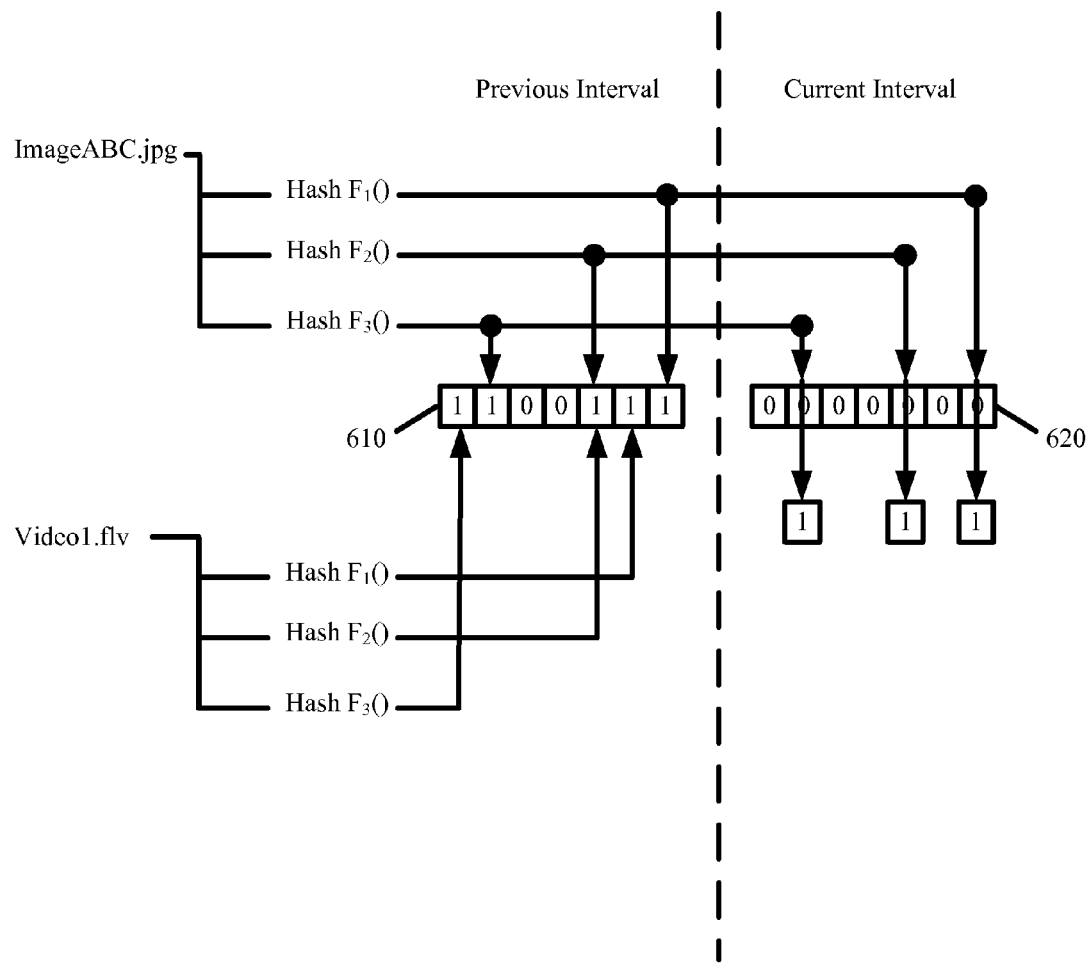
FIG. 6 conceptually illustrates state rolling in conjunction with bit array flushing in accordance with some embodiments.

FIG. 6 conceptually illustrates state rolling in conjunction with bit array flushing in accordance with some embodiments. This figure illustrates a previous state 610 and a current state 620 for the bit array. The previous state 610 tracks content that was requested at least once during a previous interval. The current state 620 tracks content that was requested at least once during a current interval. As shown, the previous state 610 for the bit array indicates that two items of content were requested during the previous interval including: 1) video1.flv, as represented by bit indices 1000110, and 2) imageABC.jpg, as represented by bit indices 0100101. The current state 620 for the bit array is flushed to clear the corresponding bit indices at the start of the current interval.

Sometime after the start of the current interval, a request is received for the content imageABC.jpg. Accordingly, the bit indices representing the content (0100101) are compared against the previous state 610 for the bit array and current state 620 for the bit array to determine if the content was requested at least once before during either the previous interval or current interval. This comparison identifies that the content imageABC.jpg was requested during the previous interval, but has not yet been requested during the current interval. This then is an indication that the current request is the second request for the content during the specified interval in which case the content is retrieved from the origin, passed to the requesting end user, and stored to cache (when performing second hit caching). In some embodiments, the bit indices representing imageABC.jpg are also set in the current state 620 for the bit array to refresh the first hit for that item of content in the current interval. By updating the current state 610 of the bit array, the count for imageABC.jpg is entered into the current interval which causes the count to be carried over into at least one subsequent interval.

FIG. 6 also illustrates how flushing with state rolling allows removal of the bit indices representing a first item of content that overlap with the bit indices representing a second item of content without affecting the bit indices for the second item of content. In this figure, video1.flv is not requested during the current interval. The bit indices representing video1.flv are therefore not refreshed in the current state 620 of the bit array though they are present in the previous state 610 of the bit array. Accordingly, should video1.flv be requested again in the next interval (i.e., the interval after the current interval), the bit indices representing video1.flv will not be present in the previous state or current state of the bit array at the next interval and the request in the next interval will be treated as the first request for that content. It should also be noted that the bit indices representing content imageABC.jpg are unaffected by the removal of the bit indices representing content video1.flv in the current state 620 for the bit array even though the bit indices for the different content overlap at the fifth index position. This is because the bit indices representing content imageABC.jpg are reentered after clearing the current state 620 for the bit array, while the bit indices representing content video1.flv are not reentered after clearing the current state 620 for the bit array.

State rolling has the further advantage of eliminating the potential for N+1 hit caching from occurring. For example, a particular item of content is requested once during a first interval and the hit count is entered to the current state of the bit array for the first interval. Between the first interval and a second interval, the state of the bit array is copied for the previous state and the bit array is flushed for the current state. During the second interval, the particular item of content is requested a second time. Due to the flushing that occurred between the first and second intervals, the hit count that occurred during the first interval is lost in the current state of bit array (for the second interval). However, the hit count is still retained in the previous state of the bit array and that information can be used to determine that the particular item of content has been requested once before and need not be requested again (i.e., a third time) in order to cache the content when performing second hit caching.

Figure 7:
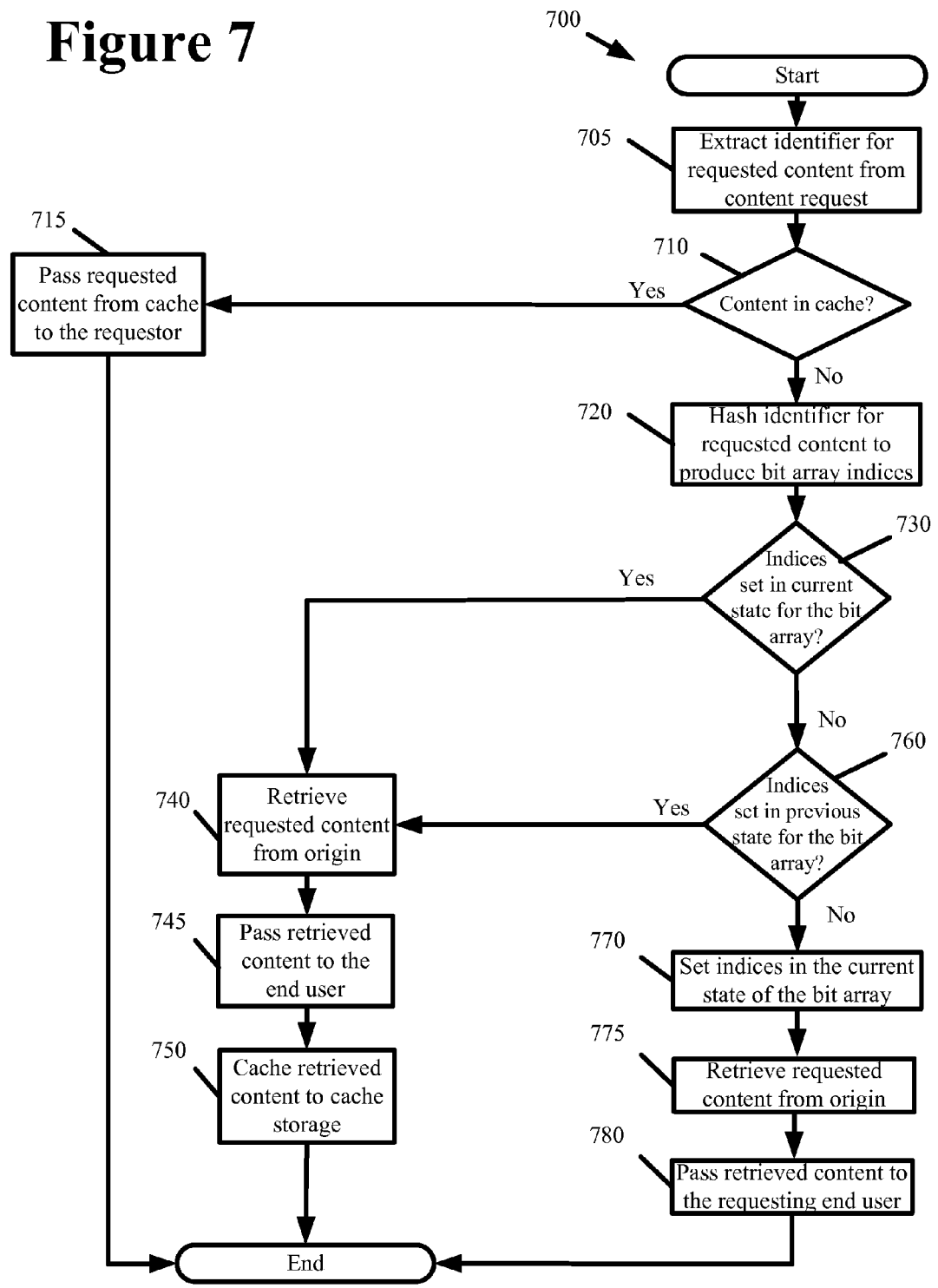
FIG. 7 presents a process for performing the optimized multi-hit caching technique with bit array flushing and state rolling in accordance with some embodiments.

FIG. 7 presents a process 700 for performing the optimized multi-hit caching technique with bit array flushing and state rolling in accordance with some embodiments. The process 700 is performed when a content request is received. The process extracts (at 705) an identifier for identifying the requested content from the request. The process scans (at 710) the cache to determine whether the content being requested is cached.

When the requested content is found in cache, the process passes (at 715) the requested content from cache to the requesting end user. Otherwise, the extracted identifier is input into the set of hashing functions to produce (at 720) bit array indices that represent the content being requested. The process determines (at 730) whether the produced indices are set in the current state for the bit array.

When the produced indices are set in the current state for the bit array, the content has already been requested at least once during the current interval and the current request is the second request for the content. Accordingly when performing interval restricted second hit caching, the process retrieves (at 740) the requested content from the proper origin, passes (at 745) the retrieved content from the origin to the requesting end user, and caches (at 750) the content to cache storage so that future requests for the same content are served from cache.

When the process determines (at 730) that the indices have not already been set in the current state for the bit array, the process determines (at 760) whether the indices are set in the previous state for the bit array. In some embodiments, the determinations performed at steps 730 and 760 are performed in parallel instead of the sequential steps of process 700.

When the indices have not been set in either the current state for the bit array or the previous state for the bit array, the process sets (at 770) the indices in the current state for the bit array, retrieves (at 775) the requested content from the proper origin, and passes (at 780) the retrieved content to the requesting end user.

When the indices are set in the previous state, the current request is then a second request for the content within the restricted interval. Accordingly, the process retrieves (at 740) the requested content from the proper origin, passes (at 745) the retrieved content from the proper origin, and caches (at 750) the content to cache storage so that future requests for the same content are served from cache.

B. Optimized N-1 Hit Caching

As was noted above, the optimized multi-hit caching technique can be adapted to perform N-hit caching, where N is an integer value that is greater than one. In some such embodiments, the optimized multi-hit caching technique is implemented using N-1 bit arrays to perform optimized N-hit caching. Each bit array is associated with a specific hit count of the N-hit caching progression. Collectively, the N-1 bit arrays identify the hit count for particular content and whether the particular content should be cached. For example, a first bit array of the N-1 bit arrays tracks whether content is requested once, a second bit array of the N-1 bit arrays tracks whether content is requested twice, etc. Therefore to increment a hit count for particular content from zero to one, the bit indices representing the particular content are set in the first bit array of the N-1 bit arrays and to increment a hit count for the particular content from one to two, the bit indices representing the particular content are set in the second bit array of the N-1 bit arrays. When the bit indices representing particular content are set in each bit array of the N-1 bit arrays, then the next request for the particular content will be indicative of the Nth hit and therefore result in the particular content being cached. The lookup into the bit arrays to determine a hit count can be performed in serial or in parallel. The lookup can be performed in parallel because each bit array of the N-1 bit arrays represents a specific hit count. Therefore, when indices representing particular content are set in some but not all of the N-1 bit arrays, the bit array that includes the indices and is representative of the highest hit count will be used to determine the hit count for the particular content.

Figure 8:
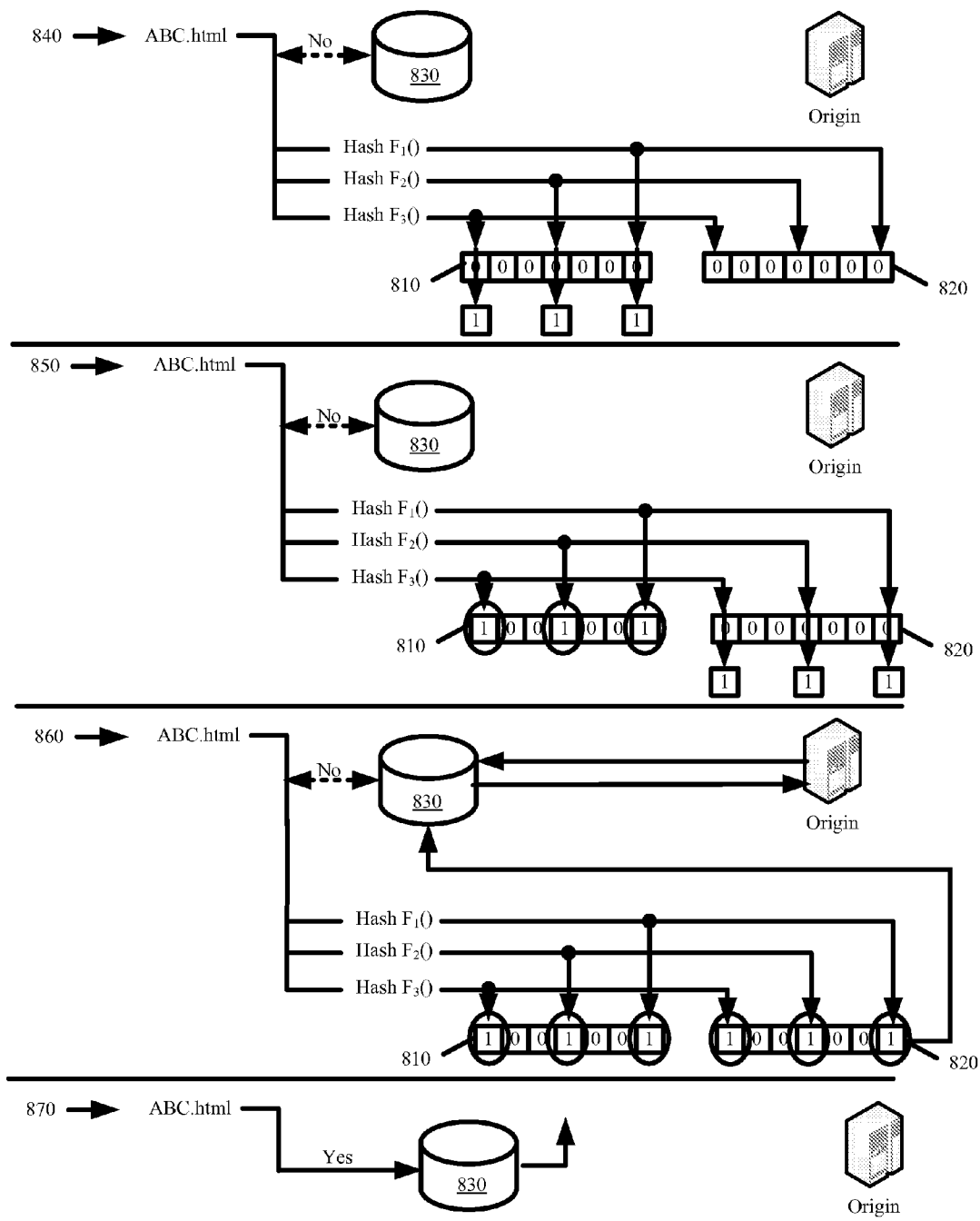
FIG. 8 conceptually illustrates using N−1 bit arrays to perform optimized N-hit caching in accordance with some embodiments.

FIG. 8 conceptually illustrates using N-1 bit arrays to perform optimized N-hit caching in accordance with some embodiments. For purposes of simplicity, FIG. 8 described performing N-hit caching using N-1 bit arrays while omitting discussion related to rolling and flushing of the bit N-1 bit arrays.

FIG. 8 illustrates performing third hit caching using two bit arrays 810 and 820. The first bit array 810 tracks content that has been requested at least once. The second bit array 820 tracks content that has been requested at least twice. The figure also illustrates cache 830 of the caching server. For purposes of simplicity, the figure is illustrates over four stages 840, 850, 860, and 870 of a particular interval.

At stage 840, a request is received for content "ABC.html". A check is made to the cache 830 to determine if the content is cached. At stage 840, the content has not been cached as the received request is the first request for the content during the interval. The bit index representation for ABC.html is produced using the set of hash functions. To optimize the request count lookup for content ABC.html, the hash function produced indices are simultaneously compared against the bit indices of the first bit array 810 and the second bit array 820. The bit arrays identify that the content has not yet been requested. Accordingly, the bit indices representing content ABC.html are entered in the first bit array 810.

At stage 850, a second request for content ABC.html is received. Again, a check is made to the cache 830 to reveal that the content is not yet cached and the hash function produced indices are simultaneously compared against the bit indices of the first bit array 810 and the second bit array 820. At stage 850, the first bit array 810 identifies that the content has been requested once and the second bit array 820 identifies that the content has not been requested twice. Accordingly, the bit indices representing content ABC.html are entered in the second bit array 820 to record the second hit.

At stage 860, a third request for content ABC.html is received. A check is made to the cache 830 to reveal that the content is not yet cached and the hash function produced indices are simultaneously compared against the bit indices of the first bit array 810 and the second bit array 820 to identify that the content has been requested at least twice before. Accordingly, the content is retrieved from the proper origin, stored to the cache 830, and passed to the requesting end user.

At stage 870, a fourth request for content ABC.html is received. A check is made to the cache 830 to reveal that the content is cached. Accordingly, the content is served to the requesting end user from cache without further access to the origin.

By simultaneously comparing the hash function produced indices with each of the N-1 bit arrays, the optimized multi-hit caching technique is able to identify content request counts in constant time and in the same amount of time needed to check a single bit array.

C. Origin Shield

An undesired effect of any multi-hit (e.g., two or more hit) caching technique is the increased load on each origin. There is approximately a 50% load increase on the origin when performing second hit caching and there is approximately an 80% load increase on the origin when performing third hit caching. Specifically, a caching server performing first hit caching retrieves content once from an origin, after which the content is cached at the caching server. A caching server performing second hit caching retrieves the same content from an origin after the first hit and after the second hit. Only after the second hit does the caching server performing second hit caching cache the content. In a distributed environment, this increased load is further exacerbated by the number of caching servers that retrieve content from the origin.

To mitigate the impact that multi-hit caching has on an origin, the optimized multi-hit caching technique of some embodiments is performed using tiered caching in conjunction with the modified bloom filter performing flushing and state rolling. In some such embodiments, the caching servers are hierarchically ordered to provide at least a first cache tier and a second cache tier between the requesting end user and the origin. Caching servers at the first cache tier receive content requests from the end users and utilize the modified bloom filter to determine if the requested content is cached or whether to cache the requested content. The second cache tier, also referred to as the origin shield, is positioned in between the first cache tier and one or more origin servers. The caching servers at the second cache tier perform first hit caching. This tiered caching in conjunction with the modified bloom filter, allows the caching server operator to achieve the advantages that are associated with avoiding caching of long-tail content while retaining the minimal processing and memory overhead that is associated with a bloom filter for tracking content request counts and cached content.

Figure 9:
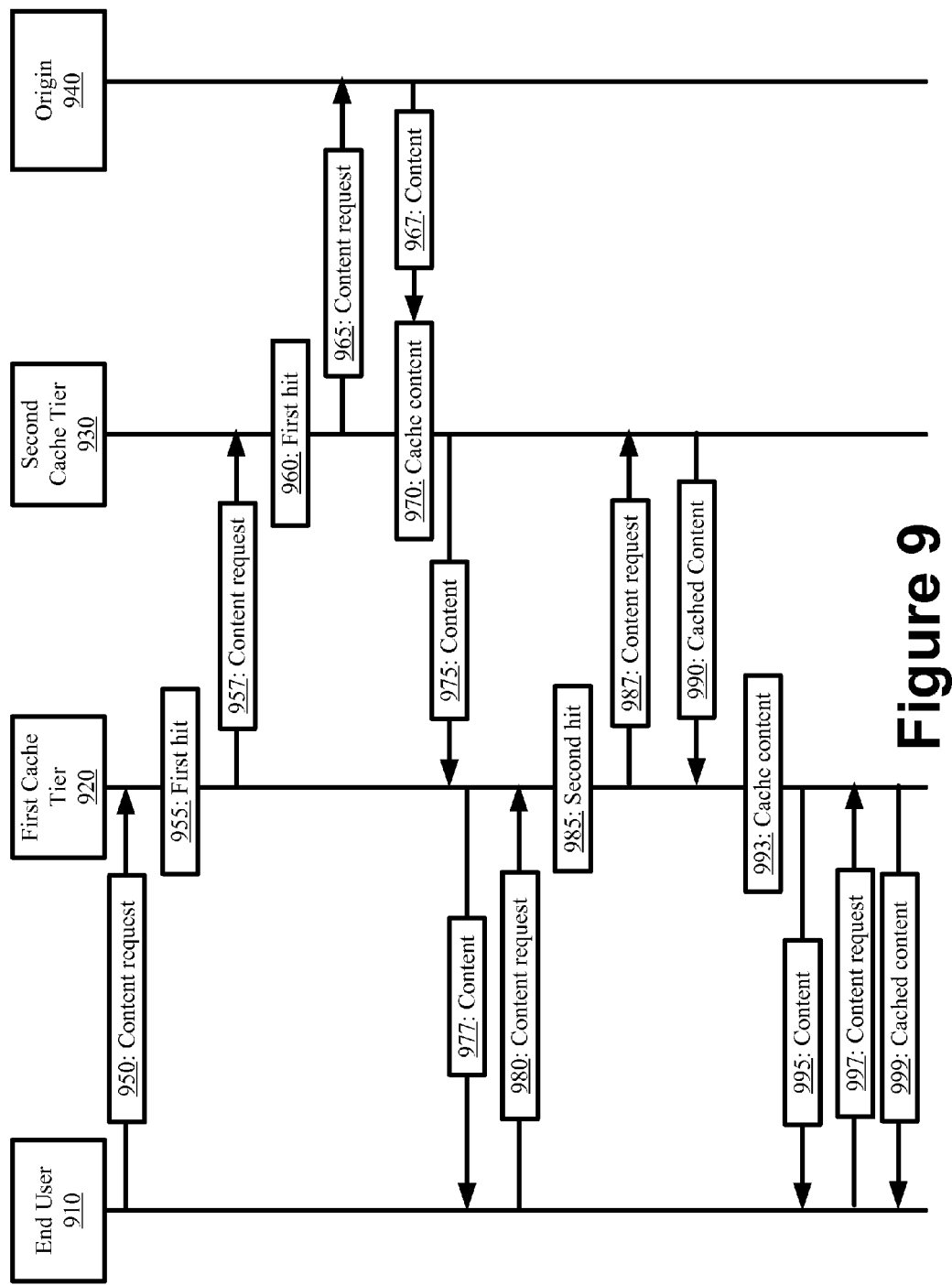
FIG. 9 illustrates the optimized multi-hit caching when using tiered caching in conjunction with the modified bloom filter performing flushing and state rolling in accordance with some embodiments.

FIG. 9 illustrates the optimized multi-hit caching when using tiered caching in conjunction with the modified bloom filter performing flushing and state rolling in accordance with some embodiments. The figure depicts a content requesting end user 910, a first cache tier 920, a second cache tier 930 operating as the origin shield, and an origin 940. The end user 910 may be representative of one or more end user devices that request particular content generated by the origin 940. The first cache tier 920 and second cache tier 930 may each comprise one or more caching servers that are operated by a CDN. The one or more caching servers of the first cache tier 920 may be geographically distributed to form different PoPs of the CDN or may be located in a single PoP of the CDN. The one or more caching servers of the second cache tier 930 may be communicably coupled to multiple different first cache tiers 920 or multiple different PoPs of the CDN and may be communicably coupled to multiple different origins even though a single origin 940 is depicted in the figure. The origin 940 may comprise one or more servers that are operated by a content provider.

When an end user 910 submits (at 950) a first request for content of the origin 940, the request is routed to the first cache tier 920 performing the above described optimized multi-hit caching using the rolling flushed bloom filter. Based on hashing of the content request and a check into the bit array, the first cache tier 920 determines (at 955) that the request is the first such request for the content of the origin 940. Rather than retrieve the requested content from the origin 940, the first cache tier 920 attempts to retrieve the content from the second cache tier 930. Accordingly, the caching server at the first cache tier 920 forwards (at 957) the request to the second cache tier 930.

The second cache tier 930 receives the content request from the first cache tier 920 and determines (at 960) that the request is the first such request for the content of the origin 940. Since the second cache tier 930 performs first hit caching, the second cache tier 930 forwards (at 965) the request to the origin 940, retrieves (at 967) the content from the origin 940, passes (at 975) the retrieved content to the caching server at the first cache tier 920, and caches (at 970) the retrieved content. The first cache tier 920 receives the content from the second cache tier 930 and passes (at 977) the content to the requesting end user 910.

When an end user 910 submits (at 980) a second request for the same content of the origin 940, the request is again routed to the first cache tier 920. Based on hashing of the content request, a check into the bit array, and a scan of the cache, the first cache tier 920 determines (at 985) that the request is the second such request for the content of the origin 940 and that the content is not yet cached at the first cache tier 920. Accordingly, the first cache tier 920 passes (at 987) the content request to the second cache tier 930. The second cache tier 930 will have cached the requested content based on the previous request for the same content and because of the first hit caching performed at the second cache tier 930. Consequently, the second cache tier 930 passes (at 990) the requested content from its cache to the first cache tier 920. In this manner, the second cache tier 930 shields the origin 940 from serving the content a second time. The first cache tier 920 receives the content from the second cache tier 930 and passes (at 995) the content to the requesting end user 910. Since the content has now been requested twice, the first cache tier 920 caches (at 993) the content in cache storage such that subsequent requests for the same content of the origin 940 can be served from cache of the first cache tier 910.

In some embodiments, the second cache tier is coupled to and services multiple caching servers at a first cache tier. In this framework, caching servers at a first cache tier comprise a first PoP of a CDN and caching servers at a second cache tier comprise a second PoP of the CDN. In some embodiments, the second cache tier is coupled to and services multiple caching servers at different first cache tiers. In this framework, caching servers at different first cache tiers comprise different PoPs of the CDN and caching servers at a second cache tier comprise a "super-PoP" of the CDN. In some embodiments, the caching servers of the first and second cache tiers are geographically collocated in the same PoP.

Figure 10:
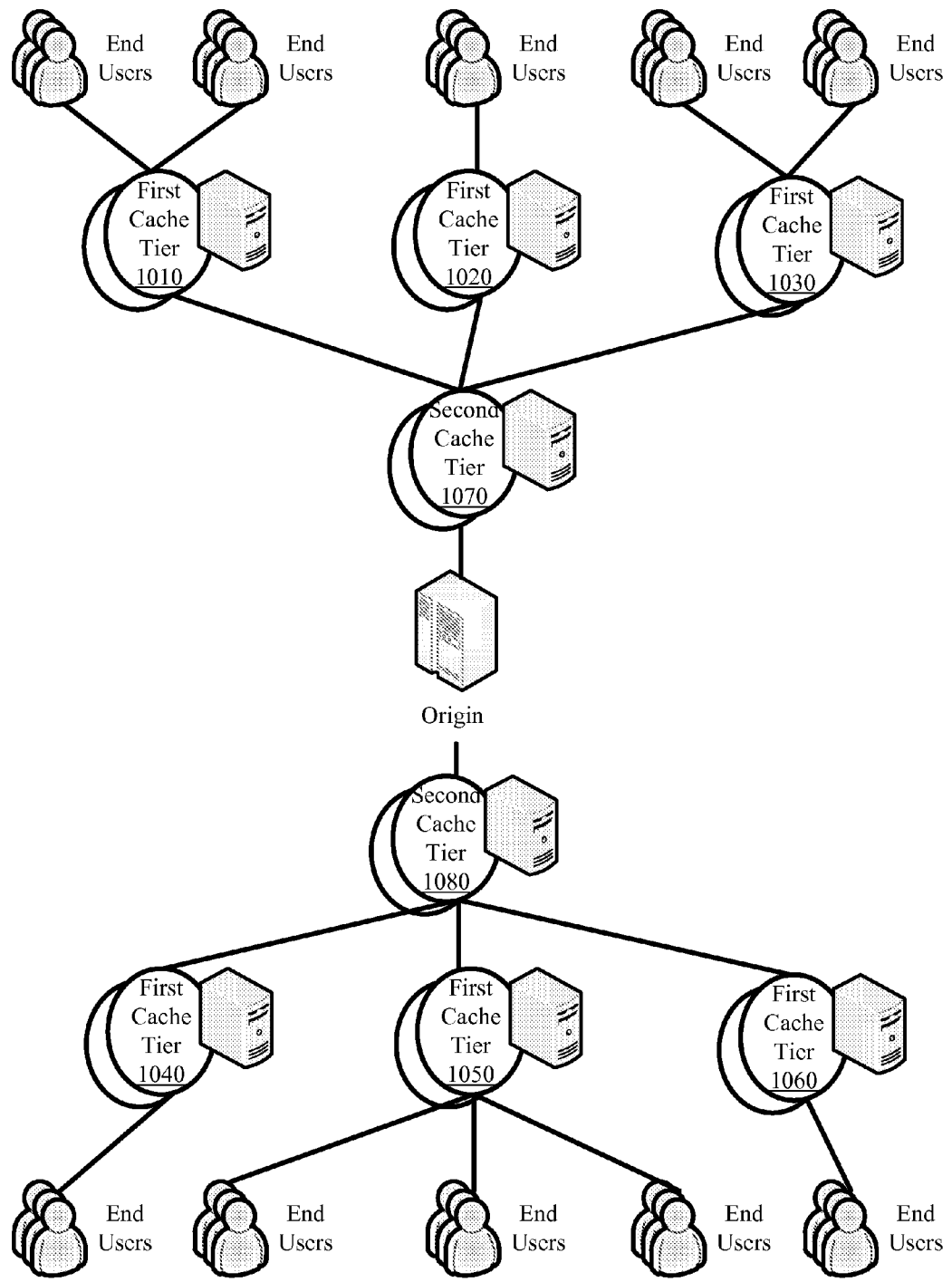
FIG. 10 illustrates a distributed platform of a CDN having multiple first cache tiers and second cache tiers in accordance with some embodiments.

FIG. 10 illustrates a distributed platform of a CDN having multiple first cache tiers 1010, 1020, 1030, 1040, 1050, and 1060 and second cache tiers 1070 and 1080 in accordance with some embodiments. As shown, each of the first cache tiers 1010-1060 are geographically proximate to a set of end users to provide optimal delivery of cached content to the end users. Each of the first cache tiers 1010-1060 may include one or more caching servers depending on the load experienced at the corresponding geographic region serviced by a particular first cache tier. Each of the first cache tiers 1010-1060 perform the optimized multi-hit caching technique according to the rolling flushed bloom filter described above. Moreover, the first cache tiers 1010-1030 are communicably coupled to the second cache tier 1070 and the first cache tiers 1040-1060 are communicably coupled to the second caching tier 1080. Furthermore, in some embodiments, each caching server at a particular first cache tier (e.g., 1010-1060) can perform the optimized multi-hit caching technique while being configured to cache on a different number of hits or different recurring intervals in which the hits occur in order to cache content.

D. Internal Caching Tier Hierarchy

The above describes the caching tiers as separate servers of a CDN. However, some embodiments implement the different caching tiers within a single server. In some such embodiments, different storage media of the same server are used for each of the different caching tiers. Each storage medium provides different performance and storage capacity. Typically, the storage medium providing the fastest performance and least capacity is allocated for storing the most frequently requested content. Slower performing but greater capacity storage media are allocated for storing the less frequently requested content.

Figure 11:
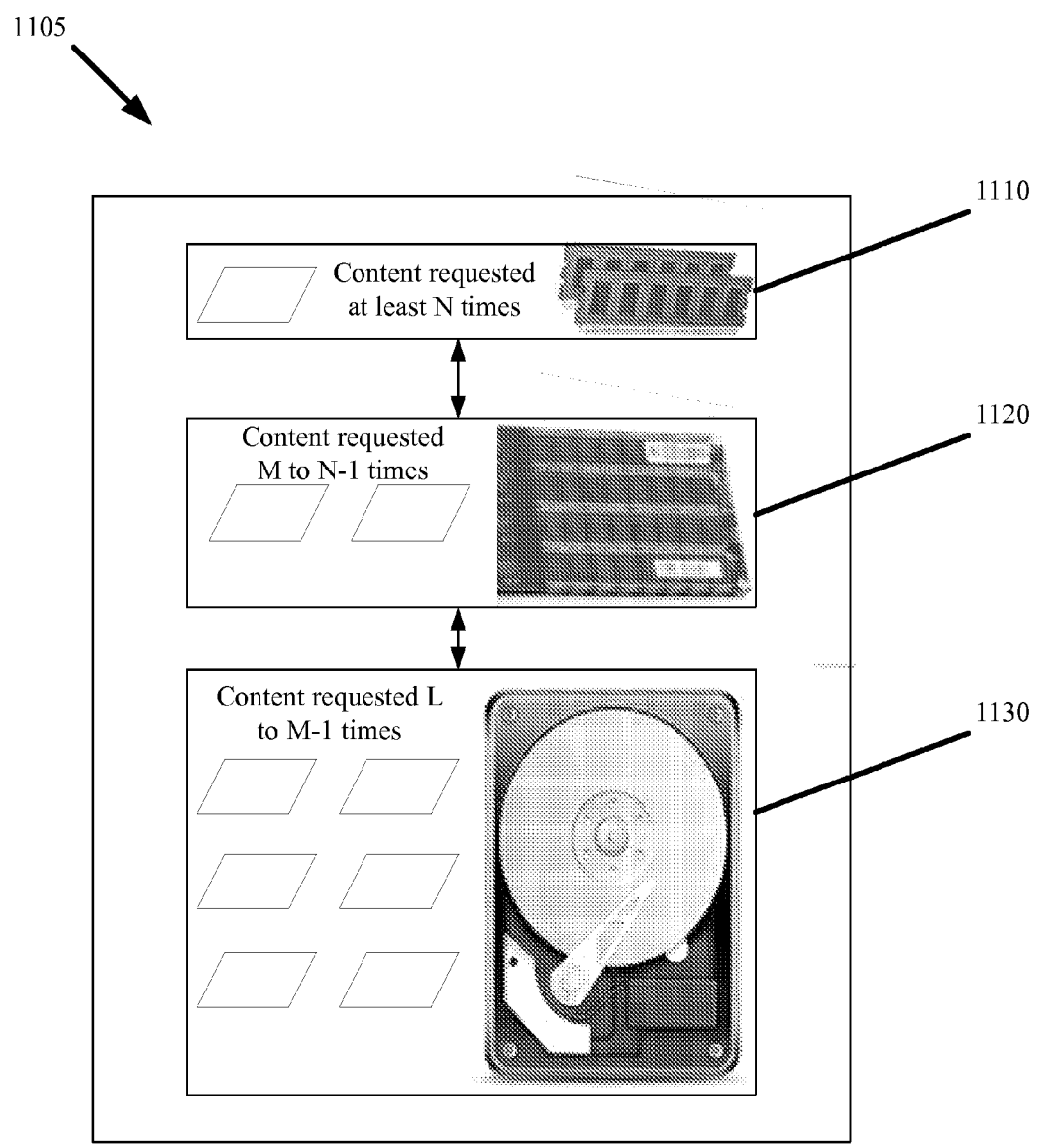
FIG. 11 conceptually illustrates configuring different storage media of a single server as different caching tiers in accordance with some embodiments.

FIG. 11 conceptually illustrates configuring different storage media 1110, 1120, and 1130 of a single server 1105 as different caching tiers in accordance with some embodiments. As shown, the different server 1105 storage media include main memory or RAM disk 1110, solid state disk 1120, and mechanical disk 1130. The server's main memory 1110 is configured to store content when the content is requested N or more times, the server's solid state disk 1120 is configured to store content when the content is requested M to N−1 times, and the server's mechanical disk is configured to store content when the content is request L to M−1 times, wherein N is a greater integer value than M and M is a greater integer value than L, and wherein main memory 1110 is a faster but smaller storage medium than solid state disk 1120 and solid state disk 1120 is a faster but smaller storage medium than mechanical disk 1130. Content is moved between the caching tiers as the different thresholds (e.g., L, M, and N) are reached as a result of how many times the content is requested within a specified interval. In some embodiments, moving content from a first storage medium to a second storage medium involves copying the content to the second storage medium before deleting the content from the first storage medium. In some other embodiments, multiple copies of the same content are retained at the various storage media. Some embodiments predefine the values for L, M, and N, whereas other embodiments allow server administrators or customers the ability to customize the values, thereby customizing when content is stored to any of the caching tiers. The number of configurable caching tiers for a server is only limited by the number of available storage media.

To summarize the discussion, it is assumed that a server has ct_1, ct_2, . . . ct_Y caching tiers configured on different storage media of the server, the threshold defined for each layer is th_1, th_2, . . . th_Y, and a specific item of content is requested M times. Accordingly, if:

M<th_1 the content is not cached;

th_1<=M<th_2 the content is cached to the ct_1 layer; and th_(x)<=M<n(x+1) the content is cached to the ct_(x) layer.

Some embodiments implement the multi-tier caching hierarchy using counting bloom filters. As is well known in the art, a counting bloom filter comprises an array with each index of the array extended from a single bit to multiple bits, wherein an index allocated with k bits can count to the ceiling of (log 2 N).

Figure 12:
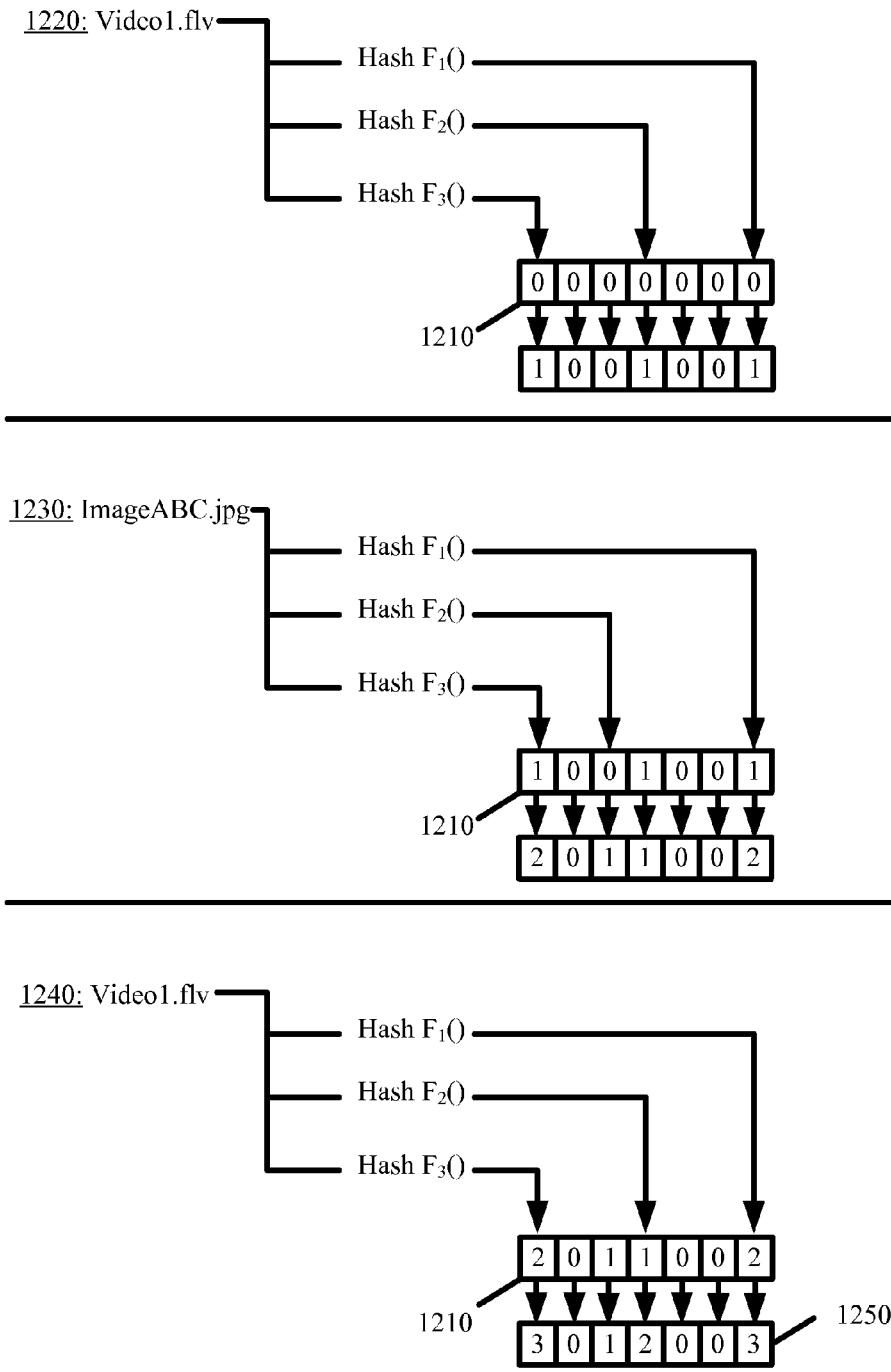
FIG. 12 conceptually illustrates using a counting bloom filter to track the number of times different content has been requested.

FIG. 12 conceptually illustrates using a counting bloom filter 1210 to track the number of times different content has been requested. The figure illustrates how the counting bloom filter 1210 tracks three content requests 1220, 1230, and 1240 where two of the requests 1220 and 1240 are for the same content.

As before, one or more hash functions produce different sets of indices that uniquely identify each of the items of content. The set of indices representing each content request are entered in the counting bloom filter 1210 by incrementing the count for the corresponding indices in the counting bloom filter 1210. As shown, the first and third requests 1220 and 1240 for the "Video1.flv" content increment the first, fourth, and seventh indices of the counting bloom filter 1210 while the second request 1230 for the "ImageABC.jpg" content increments the first, third, and seventh indices of the counting bloom filter 1210.

One can identify the number of times specific content has been requested by identifying the set of indices uniquely identifying that specific content, by querying the indices of the counting bloom filter 1210 corresponding to the set of indices identifying the specific content, and by retrieving the minimum value from the corresponding set of indices of the counting bloom filter 1210. The minimum value is the lowest value shared by all indices of the counting bloom filter identifying the specific content. The minimum value is the appropriate value because it removes from consideration greater values that may falsely identify additional hit counts as a result of other requested content having overlapping indices with the specific item of content and those overlapping indices being set in the counting bloom filter 1210.

As shown in FIG. 12, the final state of the counting bloom filter 1250 reveals index counts of 3, 2, and 3 for the "Video1.flv" content. The reason that two of the indices have a value of 3 instead of 2 is because these two indices were incremented when the "ImageABC.jpg" content was requested at 1220 because of the overlapping indices in the set of indices identifying the "Video1.flv" and "ImageABC.jpg" content respectively. Accordingly, the minimum value of the set of indices for content "Video1.flv" (i.e., 2) correctly identifies that the "Video1.flv" content was requested twice. Similarly, the final state of the counting bloom filter 1250 reveals index counts of 3, 1, and 3 for the "ImageABC.jpg" content, thereby identifying that the "ImageABC.jpg" content was requested once from the minimum index value of 1.

To adapt the counting bloom filter for tiered caching, some embodiments provide a rolling flushed counting bloom filter implementation similar to the rolling flushed implementations described above. In some such embodiments, a different pair of counting bloom filters is configured for each caching tier. For each counting bloom filter pair configured for a particular caching tier, a first counting bloom filter tracks the number of times that content cached to that particular caching tier is requested in a current interval and a second counting bloom filter tracks the number of times that content cached to that particular caching tier was requested in a previous interval with the pair of counting bloom filters being rolled and flushed whenever the interval expires. Each caching tier is also configured with a threshold value. The threshold value for a particular caching tier is indicative of a certain number of requests before content that is cached to that particular caching tier is moved to a next higher caching tier.

When content is moved from a first caching tier to a second caching tier as a result of exceeding the threshold request count set for the first caching tier, the request counts for that content are moved from the first caching tier counting bloom filters to the second caching tier counting bloom filters. The second caching tier counting bloom filters will then be used to track future requests for the content until the content is again moved to a different caching tier or is purged from cache. In either case, the request counts for that content are removed from the second caching tier counting bloom filters. Content is purged based on customer issued purge requests or purge algorithms executed by the server. The Least Recently Used (LRU) algorithm is an example of one such purge algorithm.

Figure 13:
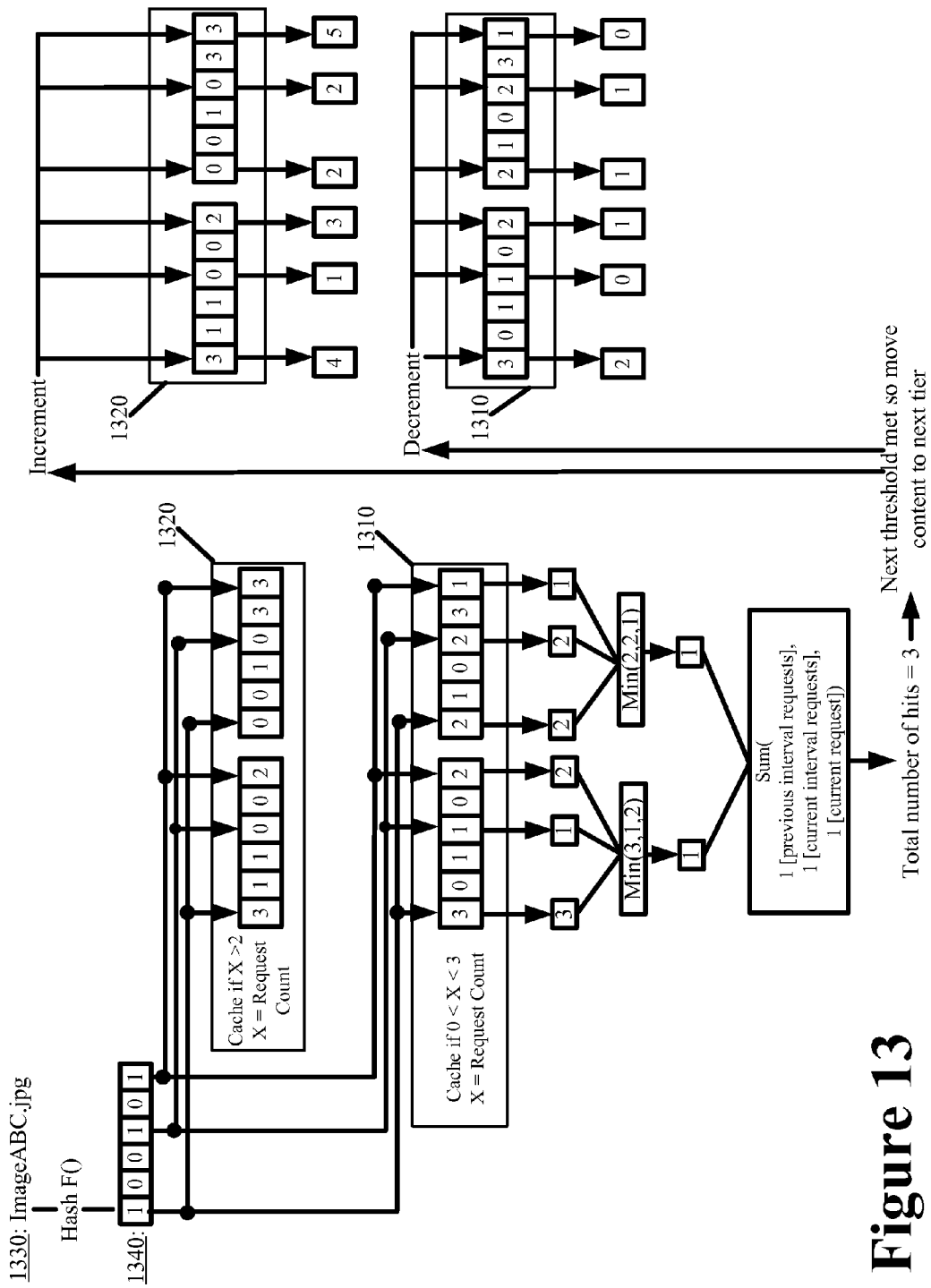
FIG. 13 conceptually updating the pair of counting bloom filters at each of the first and second caching tiers when moving content from a first caching tier to a second caching tier in accordance with some embodiments.

FIG. 13 conceptually updating the pair of counting bloom filters at each of the first and second caching tiers when moving content from a first caching tier to a second caching tier in accordance with some embodiments. The figure illustrates a lower level caching tier 1310 and a higher level caching tier 1320. The lower level caching tier 1310 caches content that is requested 1 to 2 times in a specified interval. The higher level caching tier 1320 caches content that is requested more than 2 times in the specific interval. Each caching tier 1310 and 1320 is configured with a pair of counting bloom filters that track request counts for content cached to the respective caching tier 1310 or 1320.

As shown, a request is received for content 1330. The request is hashed to produce the set of indices 1340 identifying the requested content. The set of indices 1340 are used to query the pair of counting bloom filters that are configured for the higher level caching tier 1320 before querying the pair of counting bloom filters that are configured for the lower level caching tier 1310. In some embodiments, the queries are done in parallel.

Since each index of the set of indices 1340 is set in at least one of the counting bloom filters for the lower level caching tier 1310, the server determines that the requested content is likely cached in the lower level caching tier 1310. A stat call is made to the lower level caching tier 1310 to confirm that content 1330 is cached therein. The stat call is a function of the operating system used to locate a file encapsulating the content on a storage medium and return information about the file. The stat call may return an inode or data structure containing information about the file should the file be found. If the content or encapsulating file is located, the content is retrieved and served in response to the request. Otherwise, a stat call is performed to the higher level caching tier 1320 to determine if the content can be retrieved from the higher level caching tier 1320 or from an origin.

In responding to the request, the server receiving the request also updates the counting bloom filters to track the newly received request. To do so, the request count for the content is determined by identifying the minimum value for each index of the previous interval counting bloom filter (configured for the lower level caching tier 1310) that corresponds to an index from the set of indices 1340 and by identifying the minimum value for each index of the current interval counting bloom filter (configured for the lower level caching tier 1310) that corresponds to an index from the set of indices 1340. The sum of the minimum value from each counting bloom filter provides the total request count. In this example, the total request count is two.

Since the current request added with the total current request count for the content exceeds the threshold set for the lower level caching tier 1310, the server determines that the content should be moved from the lower level caching tier 1310 to the higher level caching tier 1320.

Accordingly, the server caches a copy of the content to the higher level caching tier 1320 and deletes the cached copy of the content from the lower level caching tier 1310. Additionally, the request count for the content 1330 is moved from the lower level caching tier 1310 to the higher level caching tier 1320. This involves using the minimum value for the indices 1340 from the previous interval counting bloom filter of the lower level caching tier 1310 to increment the corresponding indices 1340 of the previous interval counting bloom filter of the higher level caching tier 1320. This further involves incrementing the minimum value for the indices 1340 from the current interval counting bloom filter of the lower level caching tier 1310 by one and using the incremented minimum value to update the corresponding indices 1340 of the current interval counting bloom filter of the higher level caching tier 1320.

As further shown in FIG. 13, in some embodiments moving the request count involves decrementing the minimum value that is for the indices 1340 in the previous interval counting bloom filter of the lower level caching tier 1310 from each of the corresponding indies 1340 in that bloom filter. Similarly, moving the request count may involve decrementing the minimum value that is for the indices 1340 in the current interval counting bloom filter of the lower level caching tier 1310 from each of the corresponding indies 1340 in that bloom filter. Such decrementing reduces the chance that a false positive for the content 1330 will occur in the lower level caching tier 1310.

The rolling and flushing of the counting bloom filters at the expiration of each interval will cause the counting bloom filters to only track request counts that are received during the most current interval and the immediately preceding interval.

Figure 14:
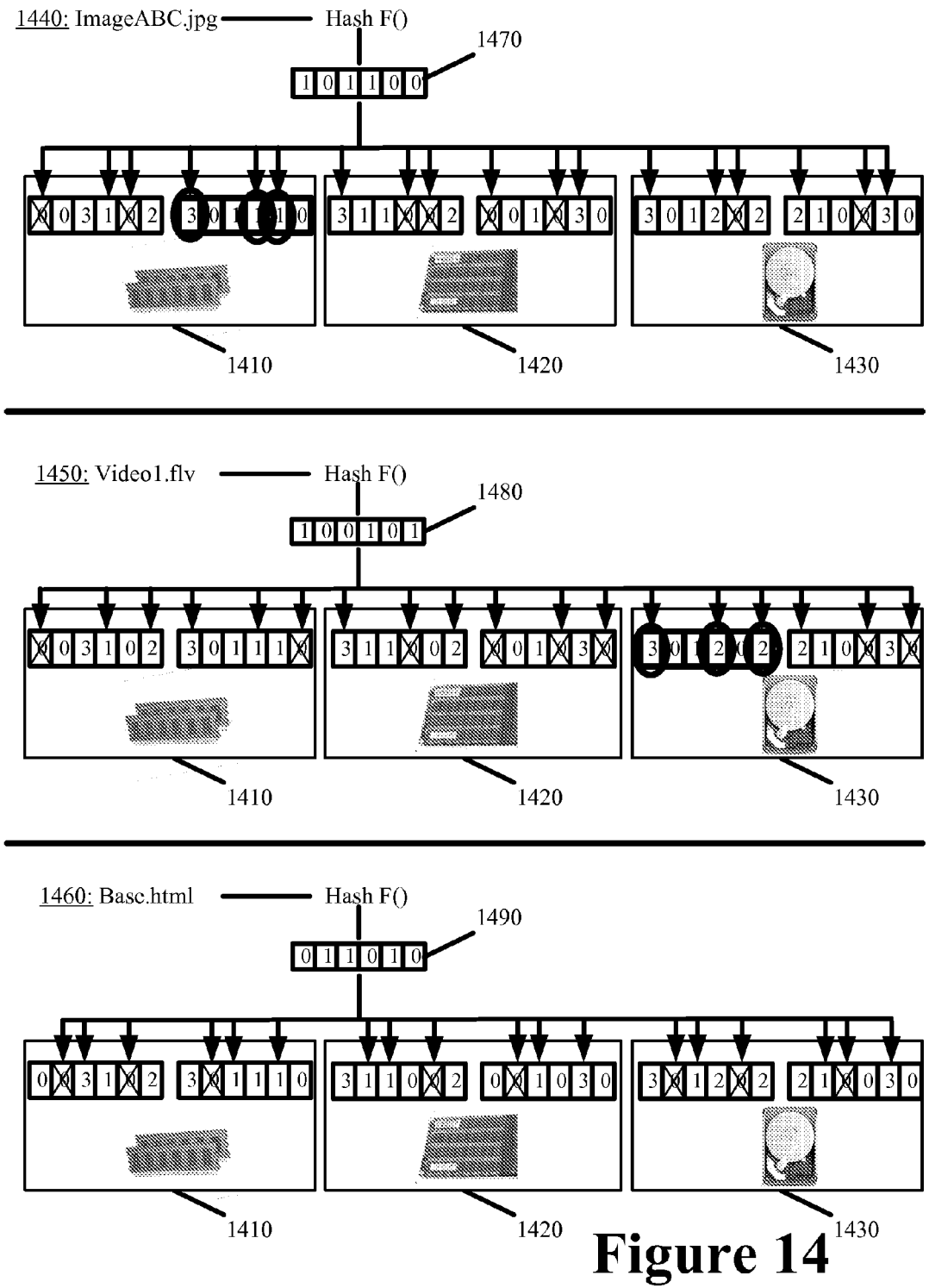
FIG. 14 conceptually illustrates using pairs of counting bloom filters for each caching tier to identify where in the caching tier hierarchy content is cached.

As noted above and as shown by FIG. 14, the pairs of counting bloom filters are also used to identify where in the caching tier hierarchy content is cached and to facilitate fast retrieval of the cached content without unnecessary stat calls to all caching tier media. FIG. 14 illustrates three caching tiers 1410, 1420, and 1430. Each caching tier is configured with a pair of counting bloom filters. The figure also illustrates three incoming requests 1440, 1450, and 1460 for different content and the identification of which caching tier the requested content is cached to using the pairs of counting bloom filters at each caching tier 1410, 1420, and 1430.

When each of the requests 1440, 1450, and 1460 is received, the identifier identifying the content being requested is hashed. The hash produces different sets of indices 1470, 1480, and 1490 that uniquely identify each of the different content being requested. The sets of indices 1470, 1480, and 1490 are queried against the pairs of counting bloom filters for each caching tier 1410, 1420, and 1430 to identify where in the caching tier hierarchy the corresponding content is cached.

When each index of the set of indices uniquely identifying content is set in one of the counting bloom filters configured for a particular caching tier, it is an indication that the content is likely to be cached to that particular caching tier. For example, the first content requested by request 1440 is determined to be cached in the first caching tier 1410 as a result of each index of the set of indices 1470 uniquely identifying the first content being set in the current interval counting bloom filter configured for the first caching tier 1410; the second content requested by request 1450 is determined to be cached in the third caching tier 1430 as a result of each index of the set of indices 1490 uniquely identifying the third content being set in the previous interval counting bloom filter configured for the third caching tier 1430; and the third content requested by request 1450 is determined to not be cached in the caching tier hierarchy, because no single counting bloom filter has each index of the set of indices 1490 identifying the third content set.

However, there is always a slight chance for a false positive when the pair of counting bloom filters identify that content is likely cached to a particular caching tier. Accordingly, some embodiments perform a stat call to that particular caching tier to ensure that the content is in fact cached therein. If so, the cached content is retrieved and served from cache. If the requested content is not found in the identified caching tier, the server performs a stat call to each of the other caching tiers to determine if the requested content is cached elsewhere. If found in another caching tier, the content is retrieved from the appropriate caching tier and served to the requestor. If the content cannot be found in any of the caching tiers, it is retrieved from an origin and served to the requestor. Additionally, the content may be cached to the caching tier providing the false positive or the set of indices identifying the requested content can be reset or decremented from the pair of counting bloom filters of the caching tier providing the false positive.

Customer initiated purges and system initiated purges are handled by identifying where in the caching tier hierarchy, the content to be purged is cached. Once found, the content is purged by deleting that content from the storage medium of the identified caching tier. In some embodiments, the purge further includes decrementing the minimum value set for the indices identifying that content from the counting bloom filters of that caching tier.

In some embodiments, when content is purged from a particular caching tier, the minimum value for the set of indices identifying that content is identified from each counting bloom filter configured for the particular caching tier. The minimum value identified from the previous interval counting bloom filter is then used to decrement each index of the set of indices from the previous interval counting bloom filter. Similarly, the minimum value identified from the current interval counting bloom filter is used to decrement each index of the set of indices from the current interval counting bloom filter. In some other embodiments, the indices of the counting bloom filters are not decremented when content is purged. Instead, some such embodiments rely on the rolling and flushing to reset the counts for the purged content.

The above implementation preserves the efficiencies of the optimized N−1 single bit array implementation described above. Memory overhead is reduced relative to other N-hit caching implementations of the prior art because of the small memory footprint needed to store each pair of counting bloom filters for each caching tier. Processing overhead is also reduced relative to other N-hit caching implementations of the prior art because of the efficiency with which the hashes can be computed in order to produce the unique sets of indices and also because of the constant linear time for querying the counting bloom filters in order to determine where in the caching hierarchy content is stored. However, the implementation may require a lookup or stat call to each of the caching tiers when the counting bloom filters do not correctly identify where in the caching tier hierarchy the content is cached.

To resolve this shortcoming, some embodiments perform tiered caching using a single counting bloom filter. In some such embodiments, the single counting bloom filter is not periodically flushed as in the preceding implementation, but is configured to operate in conjunction with one or more purging policies executed by the caching server.

The single counting bloom filter tracks request counts for different content that is requested from the caching server. As before, identifiers associated with the requested content are hashed to produce different sets of indices that identify the content. The total request count for particular content is then obtained by identifying the minimum value from the value stored by each index of the counting bloom filter that corresponds to an index in the set of indices. The total request count is then compared against a set of thresholds, wherein the set of thresholds specifies the minimum number of requests for caching content to the different caching tiers of the caching tier hierarchy. From the comparison, the caching server identifies which caching tier caches the particular content. The caching server then confirms that the particular content is present at that caching tier by performing a cache lookup or stat call to that caching tier.

This implementation may however be subject to an occasional false positive when the counting bloom filter is maintained for a sufficiently long period of time. In such cases, the caching server performs a cache lookup or stat call to the identified caching tier to ensure that the content is in fact cached to the identified caching tier. Should the content not be cached to the identified caching tier, the caching server performs a backward traversal of the caching tier hierarchy from the identified caching tier.

The backward traversal involves performing a stat call to each caching tier that is lower in the caching tier hierarchy than the identified caching tier. This backward traversal determines if the content is cached to any of those lower caching tiers. For example, if a first caching tier caches content upon a first request for that content, a second caching tier caches content upon a third request for that content, and a third caching tier caches content upon a fifth request for that content, the backward traversal may begin with identifying a false positive at the second caching tier and then performing a stat call to the first caching tier but not the third caching tier, wherein the first caching tier is the only lower caching tier in this example's hierarchy. If the requested content is found at any of the lower caching tiers, the content is retrieved and served to the requesting end user from that caching tier. Otherwise, the requested content is retrieved and served from an origin server.

The likelihood of such a false positive can be minimized by increasing the size of the counting bloom filter and specifying the hashing functions to produce the set of indices over this larger pool of indices. To further reduce the possibility of a false positive, the caching server updates the counting bloom filter as content is purged from any of the caching servers.

Figure 15:
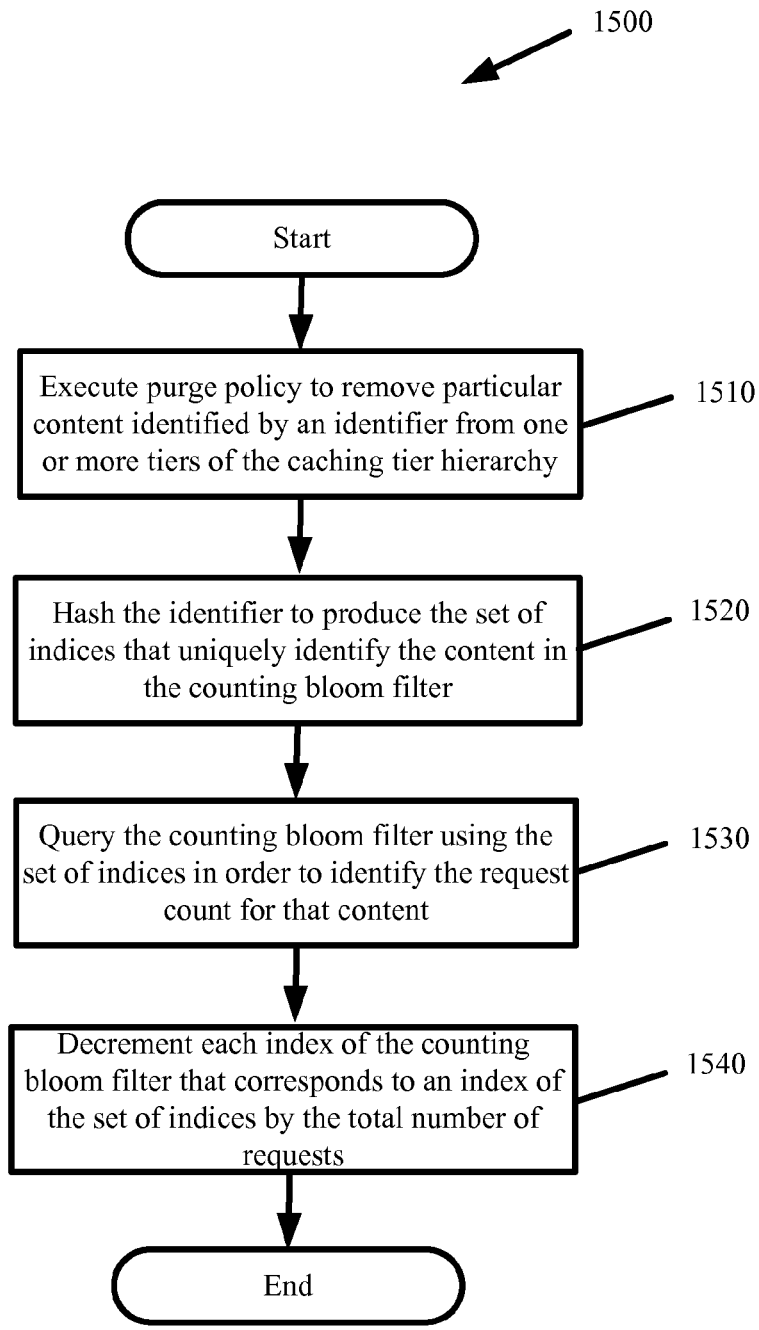
FIG. 15 presents a process for updating the single counting bloom filter in conjunction with execution of a purging policy.

FIG. 15 presents a process 1500 for updating the single counting bloom filter in conjunction with execution of a purging policy. The process 1500 commences when the particular caching server executes (at 1510) a purge policy that removes content associated with an identifier from one or more tiers of the caching tier hierarchy. The caching server hashes (at 1520) the identifier. The hash produces the set of indices that uniquely identify the content in the counting bloom filter. The caching server then queries (at 1530) the counting bloom filter using the set of indices in order to identify the request count for that content. As before, the query involves obtaining the value that is set for each index of the counting bloom filter that corresponds to an index of the produced set of indices. The process then identifies the minimum value from the obtained set of values. To update the counting bloom filter to reflect the content's removal from cache, the process decrements (at 1540) each index of the counting bloom filter that corresponds to an index of the set of indices by the minimum value (i.e., the total number of requests). In so doing, at least one index of the set of indices uniquely identifying the particular content will be set to zero, indicating that the content has been purged from cache.

The single counting bloom filter implementation improves the manner with which cached content is identified within the caching tier hierarchy. However, this implementation foregoes the benefit of caching content on a temporal or fixed interval basis. Given a sufficiently long period of time, even long-tail content will receive enough requests to be cached.

To resolve the problems associated with the rolling flushed counting bloom filter implementation and the single bloom filter implementation, some embodiments provide a hybrid implementation. The hybrid implementation configures the caching server with three counting bloom filters. Two of the counting bloom filter will be used to manage the temporal caching of content with one counting bloom filter tracking request counts over a current interval and the other counting bloom filter tracking request counts over a previous interval. These two counting bloom filters are rolled and flushed at the end of each interval. The third counting bloom filter however is not flushed and is used to retain where content is stored in cache. Specifically, the third counting bloom filter stores the highest number of requests that each item of content receives during any of the temporal periods. That count is then decremented from the third counting bloom filter to reflect the removal of that content from cache.

Figure 16:
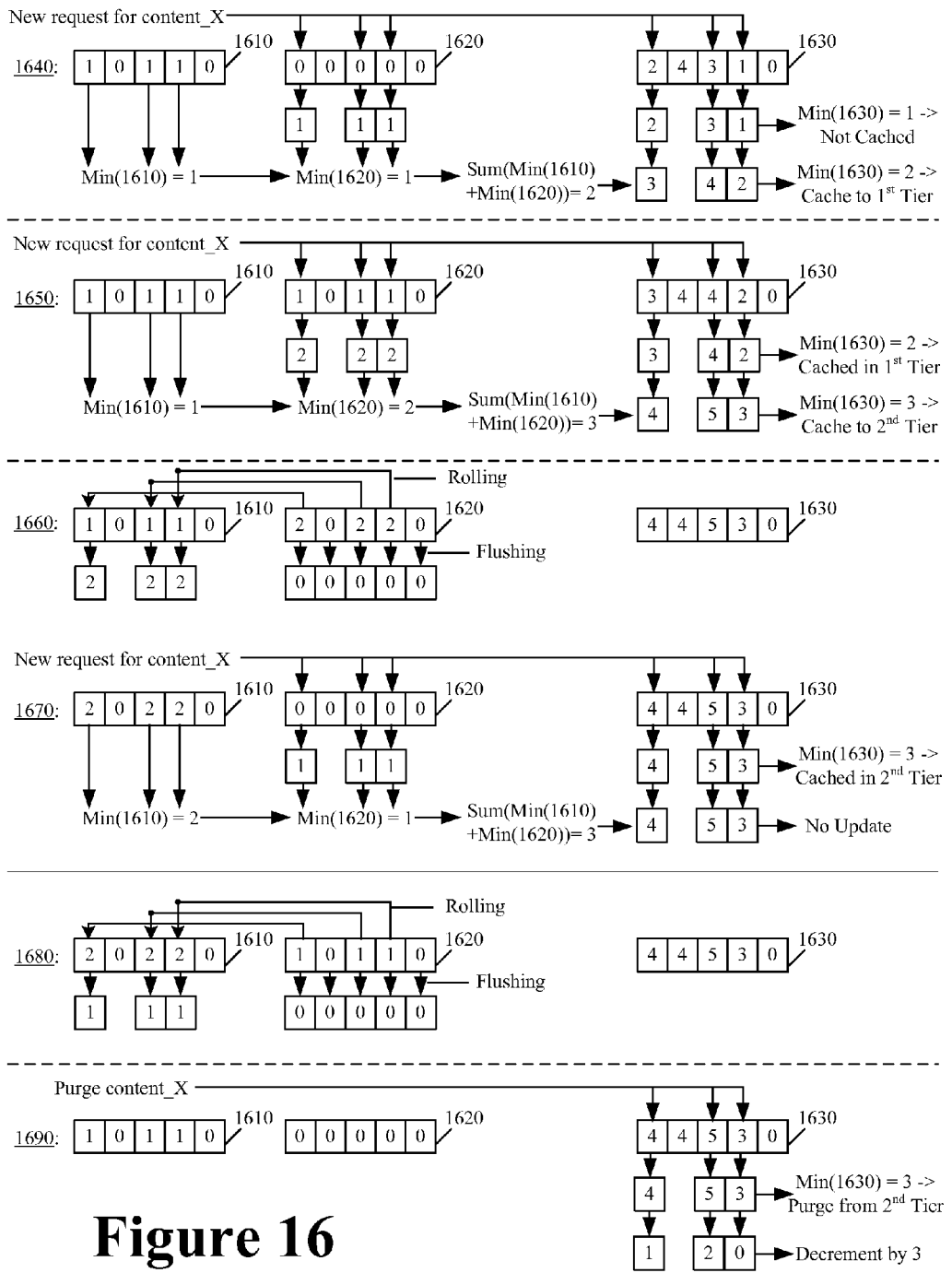
FIG. 16 illustrates caching within the caching tier hierarchy using the hybrid counting bloom filter implementation of some embodiments.

FIG. 16 illustrates caching within the caching tier hierarchy using the hybrid counting bloom filter implementation of some embodiments. The figure illustrates the states of a first counting bloom filter 1610, a second counting bloom filter 1620, and a third counting bloom filter 1630 at different times 1640, 1650, 1660, 1670, 1680, and 1690. The first counting bloom filter 1610 tracks request counts from the previous interval. The second counting bloom filter 1620 tracks request counts from the current interval. The third counting bloom filter 1630 tracks request counts during all intervals.

In this figure, it is assumed that content does not get cached to any caching tier when it is requested only once during the current and previous intervals, that content gets cached to a first caching tier when it is requested a second time during the current and previous intervals, and that content gets moved from the first caching tier to a second caching tier when it is requested a third time during the current and previous intervals. Content is then retained in the caching tier until a purge policy removes it from that caching tier.

At 1640, a new request for particular content is received. The new request is hashed and the particular content is uniquely identified by a set of indices that point to the first, third, and fourth indices of the counting bloom filters (i.e., the set of indices). A first query is made to the third counting bloom filter 1630 to determine whether the particular content is cached to any of the caching tiers. As shown, the particular content is determined to not be cached at any caching tier as a result of the fourth index in the third counting bloom filter 1630 specifying the minimum value of one. The content must therefore be retrieved and served from an origin server or origin shield.

In serial or in parallel with the query to the third counting bloom filter 1630, the caching server increments the values for the set of indices in the second counting bloom filter 1620 for the current interval. Interval 1640 illustrates that there was one request for the particular content in the previous interval and that the new request is the first such request that is received during the current interval. Accordingly, the caching server has now received two total requests for the particular content in the current and previous intervals. This causes the caching server to cache the particular content in the first caching tier. The caching server then compares the updated request count (i.e., two) two with the values that are set in the third counting bloom filter 1630. Since the third counting bloom filter 1630 specifies a lesser value of one in the fourth index of the set of indices, the caching server increments each index of the third counting bloom filter 1630 that corresponds to an index of the set of indices.

The updated values for the bloom filters is shown at 1650. At 1650 another request for the particular content is received during the same interval as in 1640. Once again, the request is hashed to produce the set of indices that uniquely identify the particular content. A query is made against the third counting bloom filter 1630 to determine that the content was requested twice in any current and previous intervals and should therefore be cached to the first caching tier. Accordingly, a cache lookup or stat call is made to the first caching tier to locate the particular content. The particular content is then retrieved and served from the first caching tier.

In serial or in parallel with the query to the third counting bloom filter 1630, the process increments the values for the set of indices in the second counting bloom filter 1620 for the current interval. Based on the sum of the minimum values for the set of indices from the first counting bloom filter 1610 and the newly incremented second bloom filter 1620, there is now three total requests for the particular content.

Based on the comparison of the updated total request count to the set of thresholds, the particular content is moved from the first caching tier to the second caching tier. The caching server again compares the updated total request count of three with the values that are set in the third counting bloom filter 1630. Since the third counting bloom filter 1630 specifies a lesser value of two in the fourth index of the set of indices, the caching server increments each index of the third counting bloom filter 1630 that corresponds to an index of the set of indices. 1660 illustrates the states of the counting bloom filters 1610, 1620, and 1630 after caching the particular content to the second caching tier.

Between 1660 and 1670, the current interval expires. Consequently, the first 1610 and second 1620 counting bloom filters are rolled and flushed. As shown at 1670, the request counts of the second counting bloom filter 1620 are copied to the first counting bloom filter 1610 and the second counting bloom filter 1620 is reset such that the second counting bloom filter 1620 continues to be used to track request counts during the new current interval.

At 1670, another request for the particular content is received by the caching server. A query to the third counting bloom filter 1630 reveals that the particular content is cached to the second caching tier as a result of the minimum value of three specified for the fourth index of the set of indices identifying the particular content. The particular content is therefore retrieved and served from the second caching tier. Should the particular content not be present in the second caching tier as a result of a false positive, the caching server performs a backward traversal of the caching tiers.

In serial or in parallel with the query to the third counting bloom filter 1630, the process increments the values for the set of indices in the second counting bloom filter 1620 for the current interval. The total request count for the previous and current intervals is then determined. From the first counting bloom filter 1610 and the updated second counting bloom filter 1620, the caching server determines an updated request count of three. The updated request count is compared to the minimum value set for the set of indices in the third counting bloom filter 1630. Since the minimum value is also three. The third counting bloom filter 1630 is not updated and the particular content is not moved in the caching tier hierarchy.

1680 illustrates the updated values of the counting bloom filters as a result of request received during 1670. Between 1680 and 1690, the current interval again expires such that the second counting bloom filter 1620 is rolled into the first counting bloom filter 1610 and the second counting bloom filter 1620 is again flushed.

At 1690, a purging policy executes causing the particular content to be removed from the second caching tier. Purging content from the caching tiers is explained below with reference to FIG. 17. In response to the purging of the particular content from cache, the caching server identifies the set of indices for the purged content. The caching server then identifies the minimum value that is set for the set of indices of the purged content in the third counting bloom filter 1630. As shown, the minimum value is three. The caching server then decrements the minimum value from each index of the third counting bloom filter 1630 that corresponds to an index of the set of indices uniquely identifying the purged content.

In some embodiments, additional caching tiers outside a particular server can be combined with the caching tiers that are internal to the particular server. For example, some embodiments implement the tiered caching by leveraging a network file storage (NFS) as a caching tier that is provided in addition to the local storage media of a server, wherein the NFS is the lowest caching tier because of the latency involved with the network access to the NFS.

Some embodiments leverage the counting bloom filters and the request counts tracked thereto in order to target purge requests only to the caching tiers that have the content cached while avoiding issuing the purge request when the content is known to not be cached at any tier of the caching tier hierarchy. In so doing, the caching server saves scarce and expensive storage media resources from being consumed on unnecessary purges of non-existent content at the minimal cost of computing a series of hashes for the counting bloom filter queries, wherein such computation consumes inexpensive processing cycles. Purge requests may be unnecessarily issued when a CDN customer requests to purge its content, but that content has not been cached because of too few requests. Purge requests can also be unnecessarily issued when a purge request for the same content is issued across all caching servers in a PoP, but only a subset of the PoP caching servers are tasked with caching that content.

Figure 17:
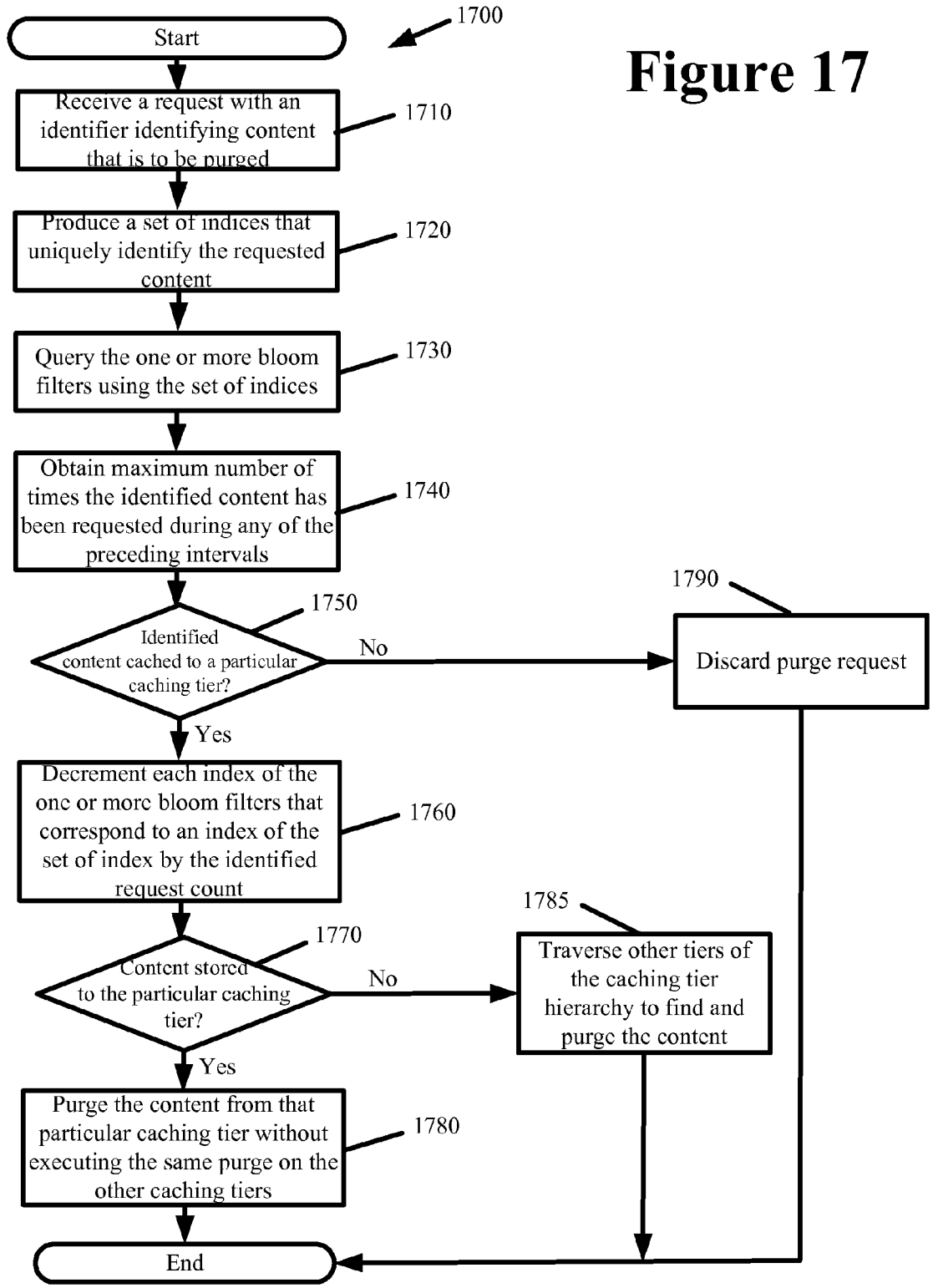
FIG. 17 presents a process for performing targeted purging in accordance with some embodiments on a server configured with X caching tiers.

FIG. 17 presents a process 1700 for performing targeted purging in accordance with some embodiments on a server configured with X caching tiers. The process 1700 commences by receiving (at 1710) a purge request. The purge request specifies an identifier identifying content that is to be purged. The process hashes (at 1720) the identifier to derive the set of indices uniquely identifying the content.

The process queries (at 1730) the one or more bloom filters using the set of indices to obtain (at 1740) the maximum number of times the identified content has been requested during any of the preceding intervals. The process compares the maximum number against the set of thresholds to determine (at 1750) which if any storage medium or X caching tier of the server the content is stored to.

When the process determines (at 1750) that the content is cached to a particular caching tier of the X caching tiers, the process decrements (at 1760) each index of the one or more bloom filters that correspond to an index of the set of indices by the identified request count. The process also performs a stat call to determine (at 1770) whether the content is in fact stored to the particular caching tier and is not identified as a result of a false positive. If the content is stored to the particular caching tier, the process purges (at 1780) the content from that particular caching tier without executing the same purge on the other caching tiers. Should the counting bloom filter(s) provide a false positive, the caching server traverses (at 1785) the other tiers of the caching tier hierarchy until the cached content is found and purged.

When the process determines that the identified content is not cached, the process discards (at 1790) the purge request. Consequently, the caching tiers are the one or more bloom filters are unaffected. In this manner, the server avoids attempting to purge non-existent content from each of the other X caching tiers, wherein such attempts consume scarce resources of the acted on caching tier as a result of having to at least traverse the corresponding storage medium of the caching tier in order to discover that the content is not present thereon. Consequently, the storage medium is free to perform other operations such as retrieving cached content to serve to requesting end users.

E. Empirical Results

Figure 18:
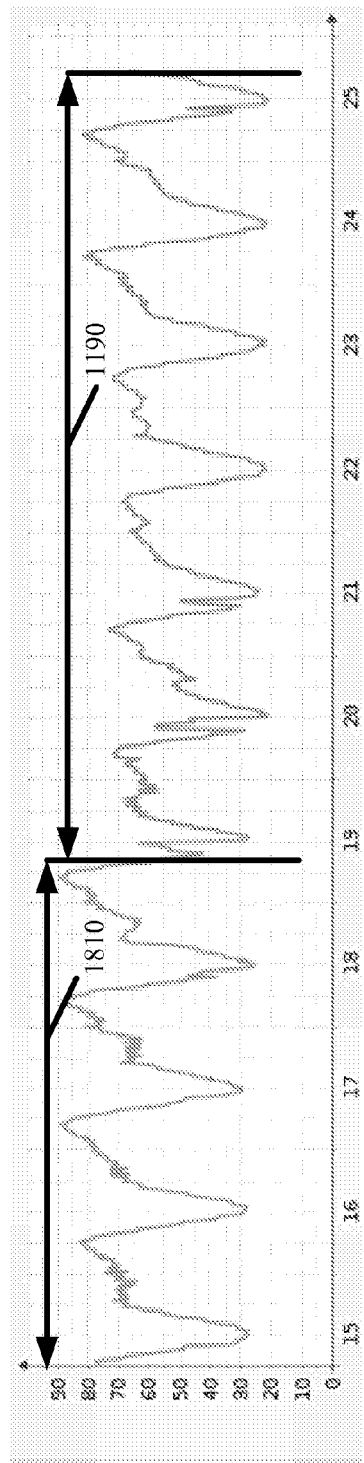
FIG. 18 illustrates the difference in disk utilization for a caching server when performing traditional first hit caching and when performing the optimized multi-hit caching in accordance with some embodiments.
Figure 19:
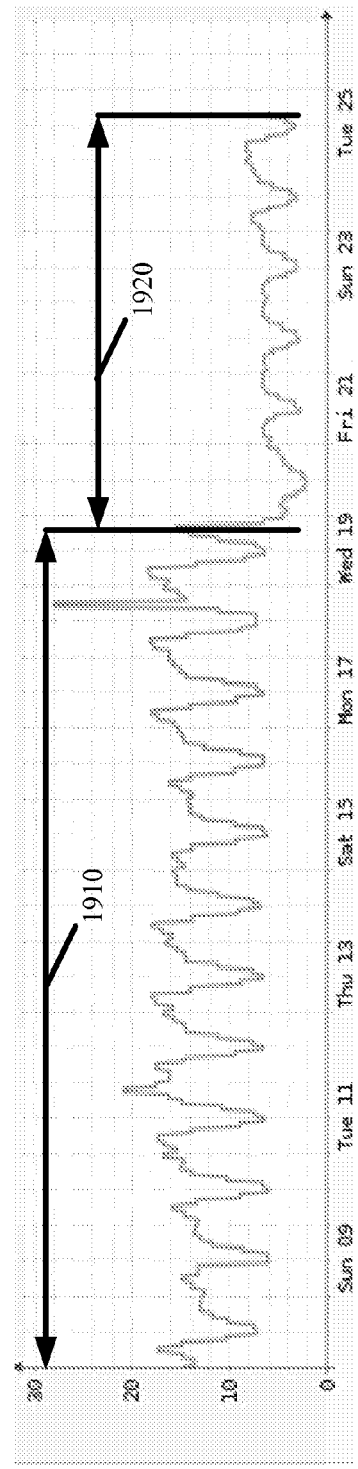
FIG. 19 illustrates the difference in cache header writes for a caching server when performing traditional first hit caching and when performing the optimized multi-hit caching using the rolling flushed bloom filter in accordance with some embodiments.
Figure 20:
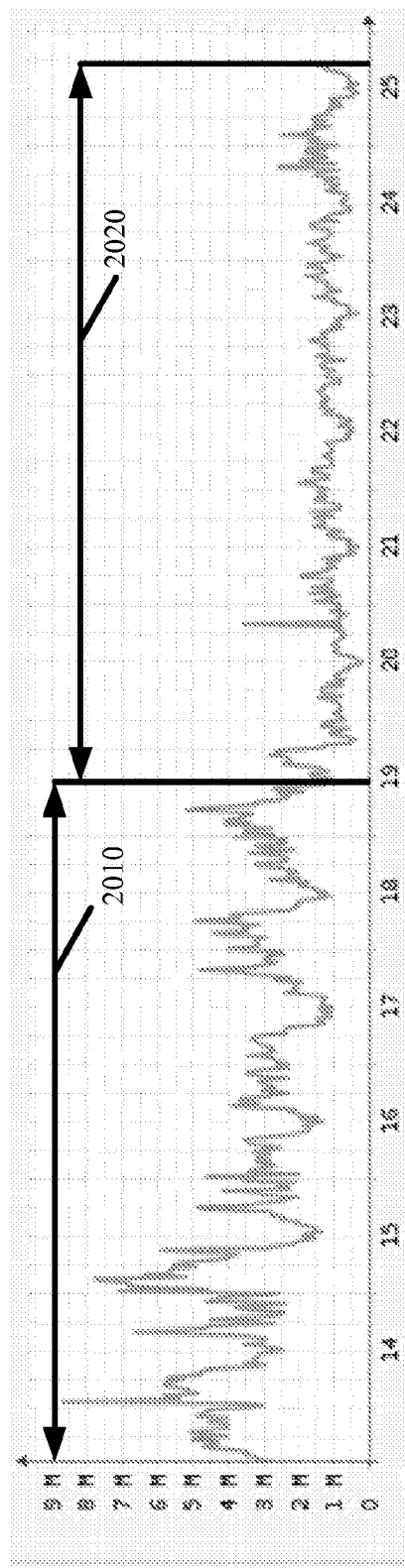
FIG. 20 illustrates the difference in disk input/output (I/O) for a caching server when performing traditional first hit caching and when performing the optimized multi-hit caching in accordance with some embodiments.

FIGS. 18-20 present measurements that illustrate the improvements to cache performance when running the optimized multi-hit caching according to the rolling flushed bloom filter. FIG. 18 illustrates the difference in disk utilization for a caching server when performing traditional first hit caching and when performing the optimized multi-hit caching in accordance with some embodiments. The x-axis represents time and more specifically, an interval spanning different days of a month. The y-axis represents percentage of disk utilization over time. During the time interval 1810, the caching server performs first hit caching. During the time interval 1820, the caching server performs the optimized multi-hit caching using the rolling flushed bloom filter. As can be seen from the disk utilization rates, the optimized multi-hit caching provides approximately 20% savings in overall disk utilization when compared to traditional first hit caching. As a result, the caching server is able to cache at least 20% more "hot" content using the same physical storage than when performing first hit caching. However, the amount of "hot" content that is stored by the caching server when performing the optimized multi-hit caching is actually much greater given that long-tail content that is requested once is not cached in contrast to when the caching server performs first hit caching.

FIG. 19 illustrates the difference in cache header writes for a caching server when performing traditional first hit caching and when performing the optimized multi-hit caching using the rolling flushed bloom filter in accordance with some embodiments. The x-axis represents time and more specifically, an interval spanning different days of a month. The y-axis represents the number of cache header writes. The cache header writes represent the number of objects that are cached at a particular caching server at a given time. During the time interval 1910, the caching server performs first hit caching and has an average maximum of approximately 18 cache header writes, an average minimum of approximately 7 cache header writes, and an average of approximately 12.5 cache header writes. During the time interval 1820, the caching server performs the optimized multi-hit caching using the rolling flushed bloom filter. For the time interval 1820, the caching server has an average maximum of approximately 7 cache header writes, an average minimum of approximately 3 cache header writes, and an average of approximately 5 cache header writes. Consequently, the optimized multi-hit caching yields an average 50% savings in cache header writes when compared to first hit caching. This improves the responsiveness of the caching server as the server performs 50% fewer resource intensive write operations. Consequently, the caching server can serve content faster and can handle greater loads without expanding the resources of the caching server.

FIG. 20 illustrates the difference in disk input/output (I/O) for a caching server when performing traditional first hit caching and when performing the optimized multi-hit caching in accordance with some embodiments. The x-axis represents time and more specifically, an interval spanning different days of a month. The y-axis represents the number of disk I/O operations performed where the disk I/O operations represent the percentage of disk I/O usage. During the time interval 2010, the caching server performs first hit caching. During the time interval 2020, the caching server performs the optimized multi-hit caching using the rolling flushed bloom filter. As can be seen from the graphs, the caching server experiences approximately a 66% reduction in the amount of disk I/O operations that are performed when caching using the optimized multi-hit caching than when caching using first hit caching. This reduction in disk I/O operations improves the responsiveness of the caching server as the caching server spends fewer cycles performing resource intensive disk I/O operations and the storage is less fragmented. This reduction in disk I/O operations further improves uptime of the caching server as the caching server is less likely to experience storage failure.

III. Server System

Many of the above-described processes and components are implemented as software processes that are specified as a set of instructions recorded on non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine is meant in its broadest sense, and can include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Furthermore, wherever a server is identified as a component of the embodied invention, it is understood that the server may be a single physical machine, or a cluster of multiple physical machines performing related functions, or virtualized servers co-resident on a single physical machine, or various combinations of the above.

Figure 21:
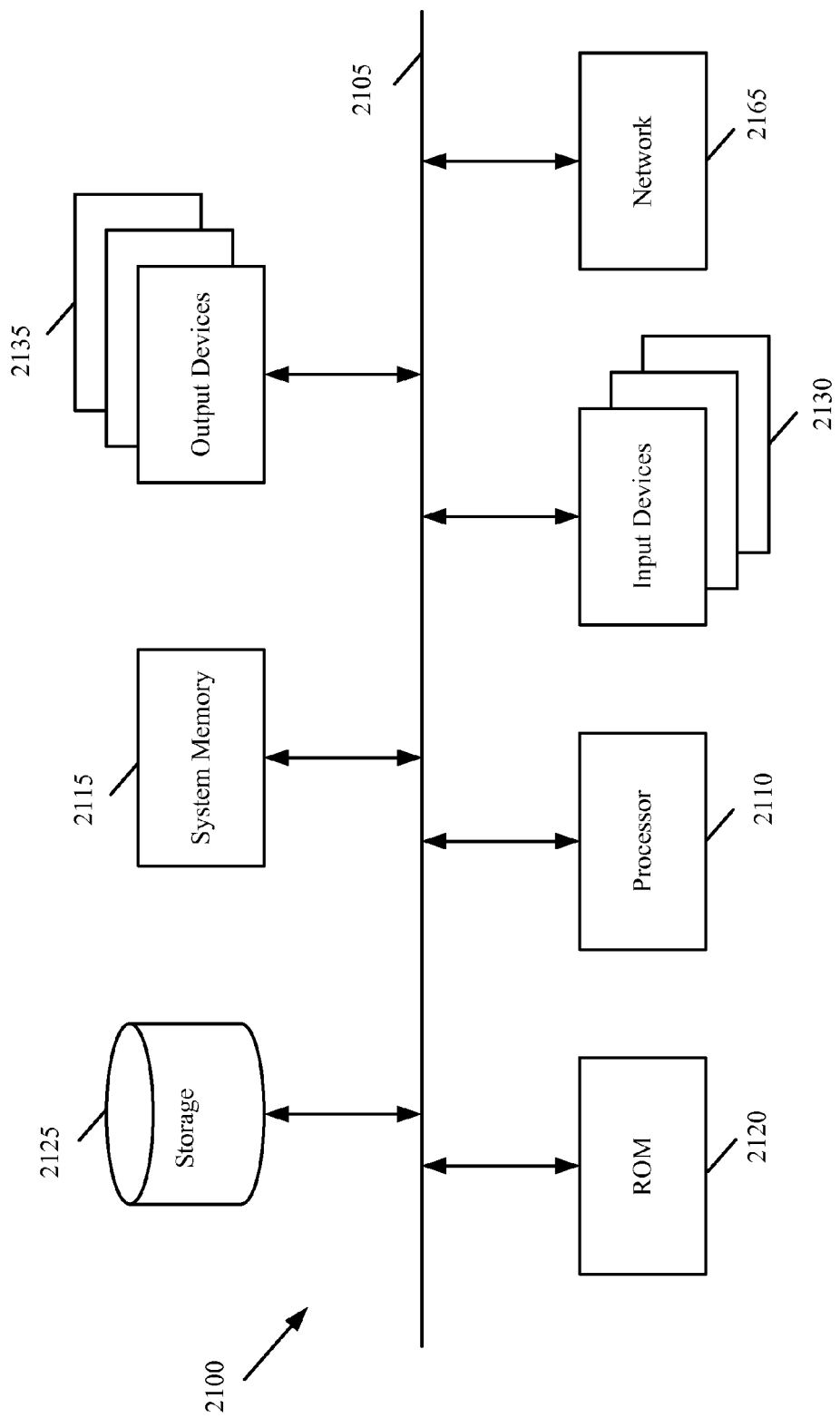
FIG. 21 illustrates a computer system or server with which some embodiments are implemented.

FIG. 21 illustrates a computer system or server with which some embodiments are implemented. Such a computer system includes various types of computer readable media and interfaces for various other types of computer readable media that implement the optimized multi-hit caching techniques and modified bloom filter implementation described above. Computer system 2100 includes a bus 2105, a processor 2110, a system memory 2115, a read-only memory 2120, a permanent storage device 2125, input devices 2130, and output devices 2135.

The bus 2105 collectively represents all system, peripheral, and chipset buses that communicatively connect the numerous internal devices of the computer system 2100. For instance, the bus 2105 communicatively connects the processor 2110 with the read-only memory 2120, the system memory 2115, and the permanent storage device 2125. From these various memory units, the processor 2110 retrieves instructions to execute and data to process in order to execute the processes of the invention. The processor 2110 is a processing device such as a central processing unit, integrated circuit, graphical processing unit, etc.

The read-only-memory (ROM) 2120 stores static data and instructions that are needed by the processor 2110 and other modules of the computer system. The permanent storage device 2125, on the other hand, is a read-and-write memory device. This device is a non-volatile memory unit that stores instructions and data even when the computer system 2100 is off. Some embodiments of the invention use a mass-storage device (such as a mechanical or optical disk and its corresponding disk drive) as the permanent storage device 2125.

Other embodiments use a removable storage device (such as a flash drive) as the permanent storage device Like the permanent storage device 2125, the system memory 2115 is a read-and-write memory device. However, unlike storage device 2125, the system memory is a volatile read-and-write memory, such a random access memory (RAM). The system memory stores some of the instructions and data that the processor needs at runtime. In some embodiments, the processes are stored in the system memory 2115, the permanent storage device 2125, and/or the read-only memory 2120.

The bus 2105 also connects to the input and output devices 2130 and 2135. The input devices enable the user to communicate information and select commands to the computer system. The input devices 2130 include alphanumeric keypads (including physical keyboards and touchscreen keyboards), pointing devices (also called "cursor control devices"). The input devices 2130 also include audio input devices (e.g., microphones, MIDI musical instruments, etc.). The output devices 2135 display images generated by the computer system. The output devices include printers and display devices, such as cathode ray tubes (CRT) or liquid crystal displays (LCD).

Finally, as shown in FIG. 21, bus 2105 also couples computer 2100 to a network 2165 through a network adapter (not shown). In this manner, the computer can be a part of a network of computers (such as a local area network ("LAN"), a wide area network ("WAN"), or an Intranet, or a network of networks, such as the internet.

As mentioned above, the computer system 2100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), mechanical and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method with which a caching server performs N hit caching of content, wherein N is an integer value greater than one, the computer-implemented method comprising:

configuring the caching server with a first array and a second array, each array comprising a plurality of indices;

for each of a plurality of requests requesting content from the caching server, identifying from the plurality of indices, a different set of indices that uniquely identifies each unique item of content;

incrementing indices of the first array that correspond to different sets of indices identifying content requested from the caching server during a first interval;

incrementing indices of the second array that correspond to different sets of indices identifying content requested from the caching server during a second interval immediately following the first interval; and obtaining at least a first count from a particular set of indices of the first array and at least a second count from the particular set of indices of the second array in response to a request for particular content, wherein the particular content is uniquely identified by the particular set of indices, and wherein the first count and the second count are different integer values greater than zero;

caching the particular content in a non-transitory storage medium of the caching server in response to a sum of the first count and the second count being at least N; and serving the particular content to the user.

2. The computer-implemented method of claim 1 further comprising retrieving to the caching server, the particular content from an origin server and serving the particular content from the caching server to a requesting end user in response to the sum of the first count and the second count equaling N.

3. The computer-implemented method of claim 1 further comprising serving the particular content without caching the particular content at the caching server in response to the sum of the first count and the second count equaling a total value less than N.

4. The computer-implemented method of claim 1, wherein the first array is a first counting bloom filter and the second array is a second counting bloom filter and wherein each index of the plurality of indices for each array comprises multiple bits for counting up to at least N−1.

5. The computer-implemented method of claim 1 further comprising overwriting the first array by copying values from the plurality of indices of the second array to the plurality of indices of the first array at expiration of the second interval.

6. The computer-implemented method of claim 5 further comprising resetting values for the plurality of indices of the second array at the expiration of the second interval.

7. The computer-implemented method of claim 1 further comprising resetting values of the second array and preserving values of the first array at expiration of the second interval.

8. The computer-implemented method of claim 7 further comprising switching roles of the first array and second array by using the second array to track requests received during a third interval immediately following the second interval.

9. A caching server comprising:
memory configured with (i) a first array tracking request counts for content requested during a current interval having a designated time span and (ii) a second array tracking request counts for content requested during a previous interval immediately preceding the current interval;
wherein the memory is configured to, for each of a plurality of requests requesting content from the caching server, identify from a plurality of indices in the first and second arrays, a different set of indices that uniquely identifies each unique item of content;
a first non-transitory storage medium caching content requested at least N times based on a sum total of request counts tracked to the first array during the current interval and request counts tracked to the second array during the previous interval; and
a second non-transitory storage medium caching content requested at least M times based on a sum total of request counts tracked to the first array during the current interval and request counts tracked to the second array during the previous interval, wherein N is an integer value that is greater than M and the second non-transitory storage medium is slower than the first non-transitory storage medium.

10. The caching server of claim 9, wherein the first array is a first counting bloom filter and the second array is a second counting bloom filter, each counting bloom filter comprising at least a plurality of indices with different sets of the plurality of indices uniquely identifying different content.

11. The caching server of claim 9, wherein the first array comprises a first plurality of multi-bit indices, wherein the first array tracks content request counts by incrementing different sets of the first plurality of multi-bit indices corresponding to different sets of indices that uniquely identify different instances of content that are requested during the current interval, wherein the second array comprises a second plurality of multi-bit indices, and wherein the second array tracks content request counts by incrementing different sets of the second plurality of multi-bit indices corresponding to different sets of indices that uniquely identify different instances of content that are requested during the previous interval.

12. The caching server of claim 11 further comprising a processor (i) determining a request count for particular content during the current interval by identifying a minimum value for each index of the first plurality of indices that corresponds to an index of the particular set of indices uniquely identifying the particular content and (ii) determining a request count for the particular content during the previous interval by identifying a minimum value for each index of the second plurality of indices that corresponds to an index of the particular set of indices uniquely identifying the particular content.

13. The caching server of claim 11 further comprising a processor determining M requests for particular content when a minimum value for a set of indices from the first plurality of indices that correspond to a particular set of indices uniquely identifying the particular content summed with a minimum value for a set of indices from the second plurality of indices that correspond to the particular set of indices uniquely identifying the particular content equals at least M−1.

14. The caching server of claim 9 further comprising a networked interface forwarding content to a requesting end user in response to a request from the end user, wherein the networked interface (i) forwards the content from the first non-transitory storage medium when the content was previously requested N times during the current interval and the previous interval, (ii) forwards the content from the second non-transitory storage medium when the content was previously requested M times during the current interval and the previous interval, (iii) forwards the content from an origin server when the content was previously requested less than M times.

15. The caching server of claim 9 further comprising a routine overwriting request counts of the second array with the request counts of the first array and erasing the request counts of the first array when restarting the current interval at expiration of the designated time span.

16. The caching server of claim 9 further comprising a mapping table identifying the first non-transitory storage medium as caching content that is requested more than N times and identifying the second non-transitory storage medium as caching content that is requested between M and N−1 times.

* * * * *